US010929000B2

(12) United States Patent
Kanazawa

(10) Patent No.: US 10,929,000 B2
(45) Date of Patent: Feb. 23, 2021

(54) INTERFACE APPARATUS, INFORMATION PROCESSING APPARATUS, AND NON-TRANSITORY COMPUTER READABLE MEDIUM STORING PROGRAM

(71) Applicant: FUJI XEROX CO., LTD., Tokyo (JP)

(72) Inventor: Yuki Kanazawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/514,981

(22) Filed: Jul. 17, 2019

(65) Prior Publication Data

US 2020/0272312 A1 Aug. 27, 2020

(30) Foreign Application Priority Data

Feb. 22, 2019 (JP) ................................ 2019-030745

(51) Int. Cl.
*G06F 3/0484* (2013.01)
*G06F 3/0482* (2013.01)

(52) U.S. Cl.
CPC ........ *G06F 3/04847* (2013.01); *G06F 3/0482* (2013.01)

(58) Field of Classification Search
CPC .......................... G06F 3/04847; G06F 3/0482
USPC .......................................................... 715/771
See application file for complete search history.

(56) References Cited

U.S. PATENT DOCUMENTS

| | | | |
|---|---|---|---|
| 9,998,617 B2 | 6/2018 | Shinohara | |
| 2017/0068854 A1* | 3/2017 | Markiewicz | G06K 9/222 |
| 2017/0208193 A1* | 7/2017 | Shinohara | H04N 1/00411 |

FOREIGN PATENT DOCUMENTS

| | | |
|---|---|---|
| JP | 2017130014 | 7/2017 |

* cited by examiner

*Primary Examiner* — Andrey Belousov
(74) *Attorney, Agent, or Firm* — JCIPRNET

(57) ABSTRACT

An interface apparatus includes: one or more processors programmed to: receive, from a user, designation of a setting change to at least one setting item; move, on a setting screen displayed on a display, the at least one setting item of which setting has been designated to change; and display, on the display, a movement of the at least one setting item of which setting has been designated to change from an original position to a position of a movement destination, wherein after the movement of the at least one setting item, the at least one setting item is displayed in a display manner different than a display manner in which other setting items are displayed.

14 Claims, 12 Drawing Sheets

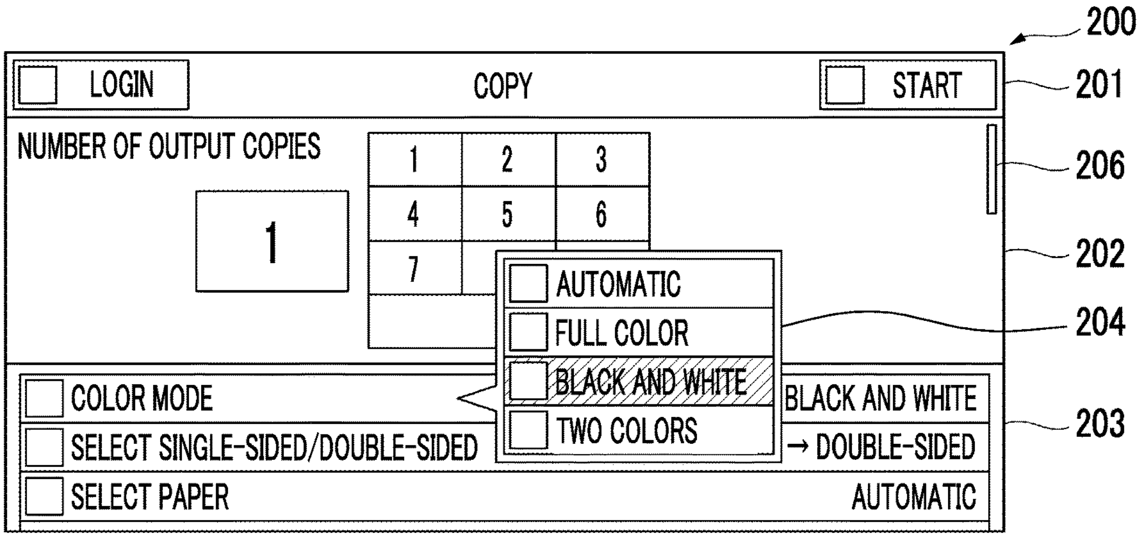

FIG. 4A

| LOGIN | COPY | START |

NUMBER OF OUTPUT COPIES

| 1 | 2 | 3 |
| 4 | 5 | 6 |
| 7 | | |

1

☐ AUTOMATIC
☐ FULL COLOR
☑ BLACK AND WHITE
☐ TWO COLORS

☐ COLOR MODE — BLACK AND WHITE
☐ SELECT SINGLE-SIDED/DOUBLE-SIDED → DOUBLE-SIDED
☐ SELECT PAPER — AUTOMATIC

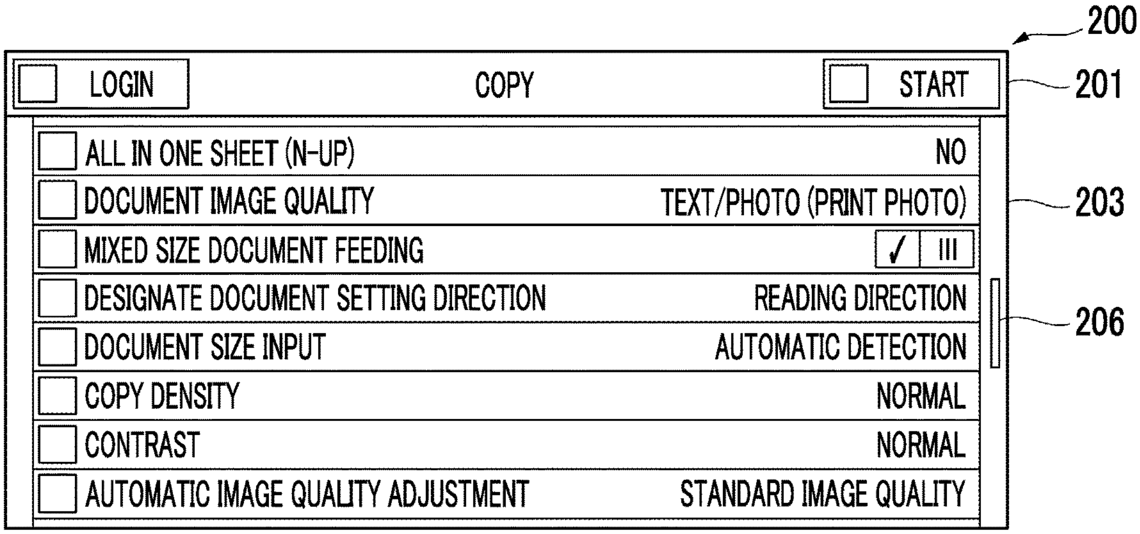

FIG. 4B

| LOGIN | COPY | START |

☐ ALL IN ONE SHEET (N-UP) — NO
☐ DOCUMENT IMAGE QUALITY — TEXT/PHOTO (PRINT PHOTO)
☐ MIXED SIZE DOCUMENT FEEDING — ✓
☐ DESIGNATE DOCUMENT SETTING DIRECTION — READING DIRECTION
☐ DOCUMENT SIZE INPUT — AUTOMATIC DETECTION
☐ COPY DENSITY — NORMAL
☐ CONTRAST — NORMAL
☐ AUTOMATIC IMAGE QUALITY ADJUSTMENT — STANDARD IMAGE QUALITY

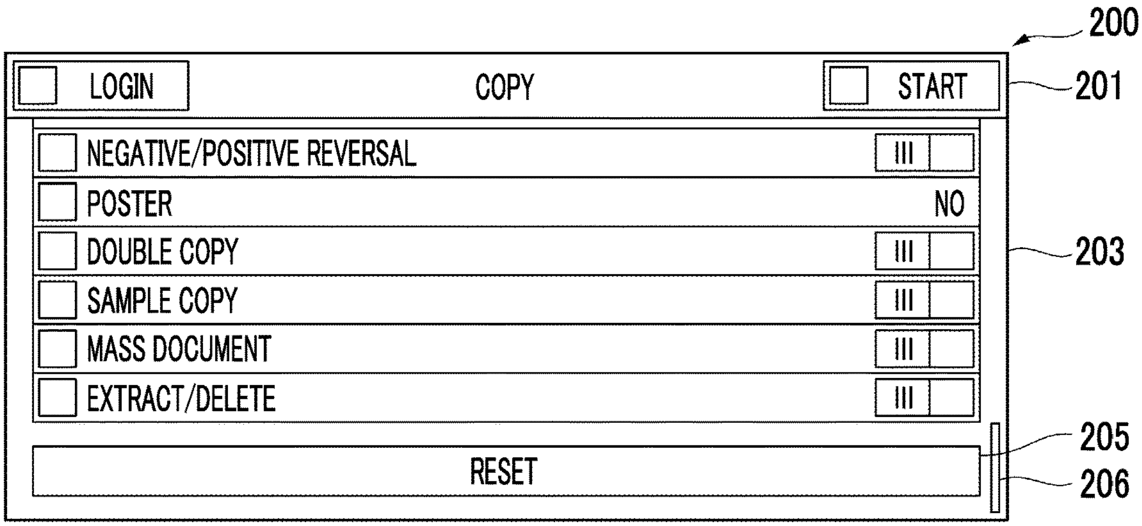

FIG. 4C

| LOGIN | COPY | START |

☐ NEGATIVE/POSITIVE REVERSAL
☐ POSTER — NO
☐ DOUBLE COPY
☐ SAMPLE COPY
☐ MASS DOCUMENT
☐ EXTRACT/DELETE

RESET

FIG. 9A

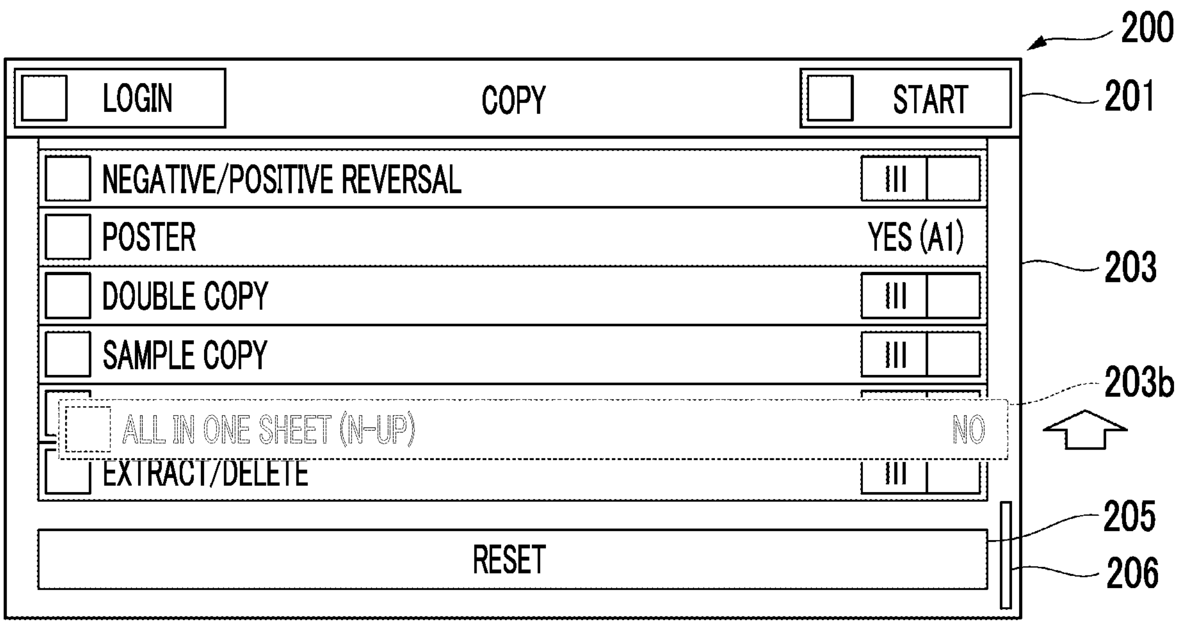

FIG. 9B

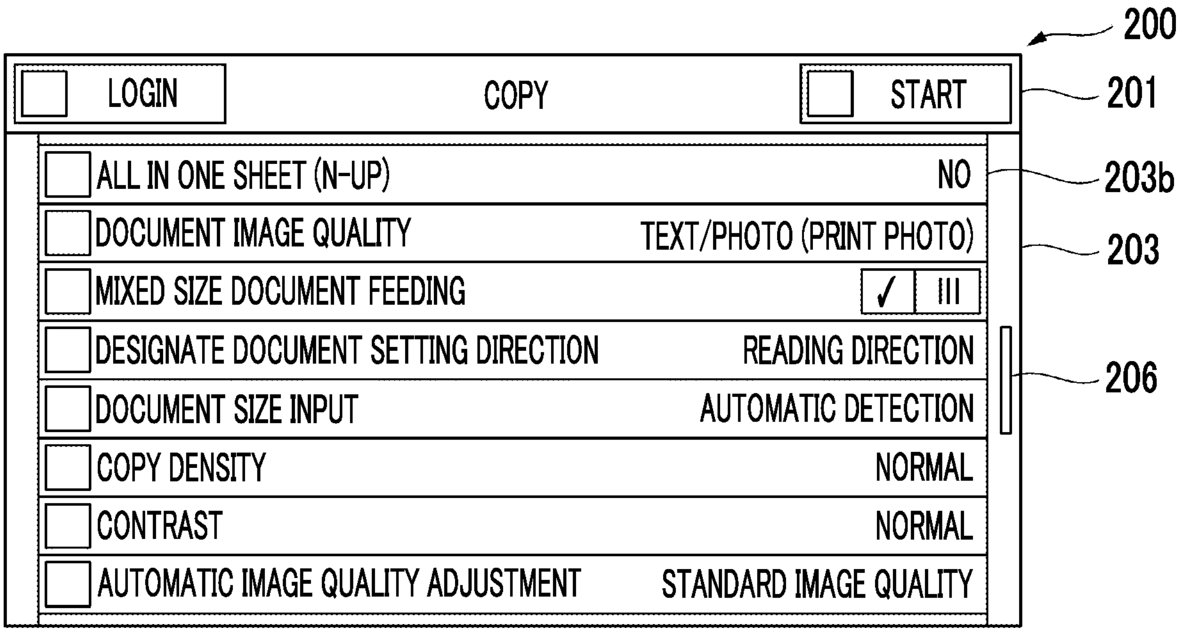

| LOGIN | COPY | START |
|---|---|---|
| ☐ NEGATIVE/POSITIVE REVERSAL | | ⦀ |
| ☐ POSTER | | YES (A1) |
| ☐ DOUBLE COPY | | ⦀ |
| ☐ SAMPLE COPY | | ⦀ |
| ☐ ALL IN ONE SHEET (N-UP) | | NO |
| ☐ EXTRACT/DELETE | | ⦀ |
| RESET | | |

| LOGIN | COPY | START |
|---|---|---|
| ☐ ALL IN ONE SHEET (N-UP) | | NO |
| ☐ DOCUMENT IMAGE QUALITY | | TEXT/PHOTO (PRINT PHOTO) |
| ☐ MIXED SIZE DOCUMENT FEEDING | | ✓ ⦀ |
| ☐ DESIGNATE DOCUMENT SETTING DIRECTION | | READING DIRECTION |
| ☐ DOCUMENT SIZE INPUT | | AUTOMATIC DETECTION |
| ☐ COPY DENSITY | | NORMAL |
| ☐ CONTRAST | | NORMAL |
| ☐ AUTOMATIC IMAGE QUALITY ADJUSTMENT | | STANDARD IMAGE QUALITY |

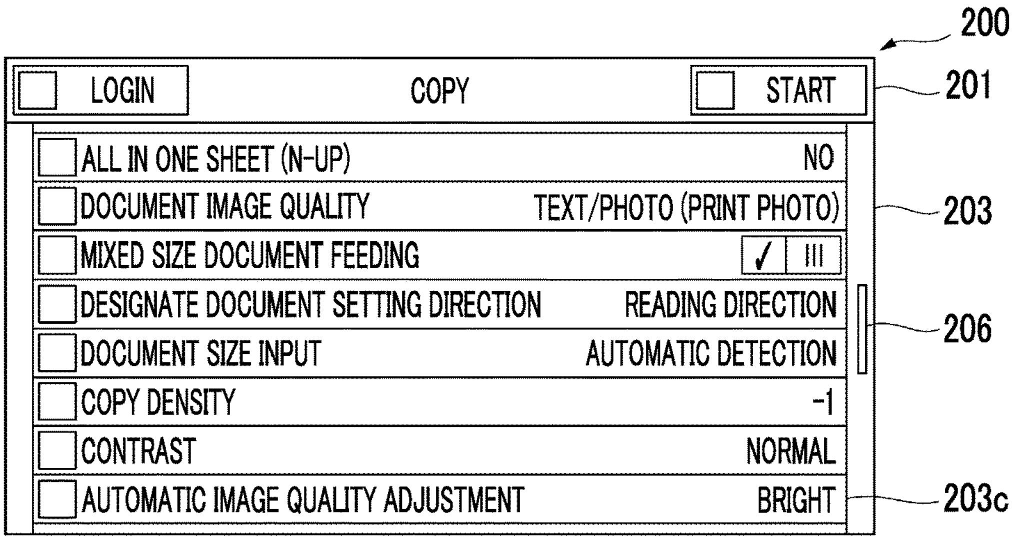

FIG. 10A

| | | | | 200 |
|---|---|---|---|---|
| | | | | 201 |

- LOGIN | COPY | START
- ☐ ALL IN ONE SHEET (N-UP) — NO
- ☐ DOCUMENT IMAGE QUALITY — TEXT/PHOTO (PRINT PHOTO)  — 203
- ☐ MIXED SIZE DOCUMENT FEEDING — ✓ |||
- ☐ DESIGNATE DOCUMENT SETTING DIRECTION — READING DIRECTION
- ☐ DOCUMENT SIZE INPUT — AUTOMATIC DETECTION  — 206
- ☐ COPY DENSITY — -1
- ☐ CONTRAST — NORMAL
- ☐ AUTOMATIC IMAGE QUALITY ADJUSTMENT — BRIGHT  — 203c

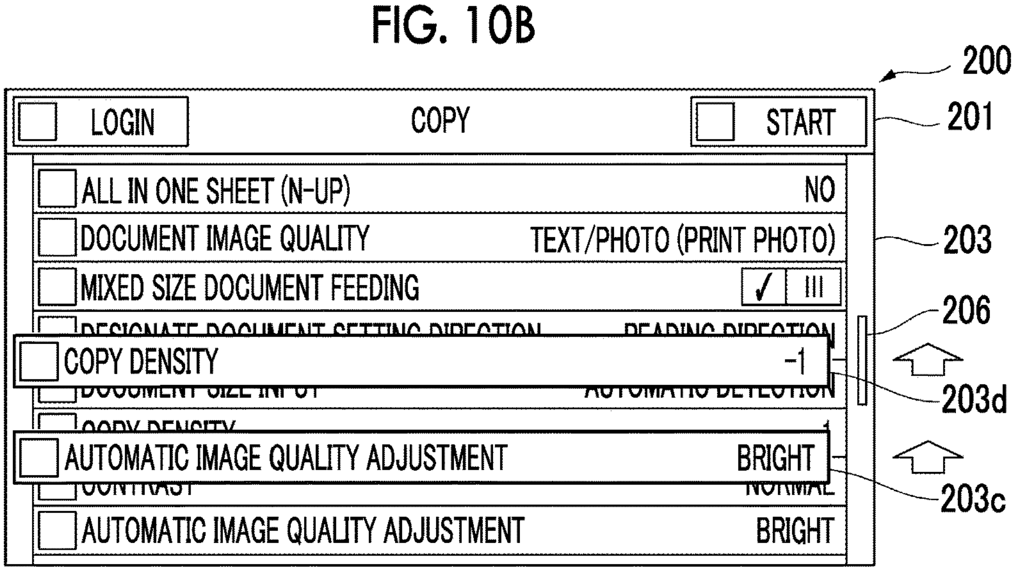

FIG. 10B

- LOGIN | COPY | START  — 200, 201
- ☐ ALL IN ONE SHEET (N-UP) — NO
- ☐ DOCUMENT IMAGE QUALITY — TEXT/PHOTO (PRINT PHOTO)  — 203
- ☐ MIXED SIZE DOCUMENT FEEDING — ✓ |||
- ☐ DESIGNATE DOCUMENT SETTING DIRECTION — READING DIRECTION  — 206
- ☐ COPY DENSITY — -1  — 203d
- ☐ DOCUMENT SIZE INPUT — AUTOMATIC DETECTION
- ☐ COPY DENSITY — -1
- ☐ AUTOMATIC IMAGE QUALITY ADJUSTMENT — BRIGHT  — 203c
- ☐ CONTRAST — NORMAL
- ☐ AUTOMATIC IMAGE QUALITY ADJUSTMENT — BRIGHT

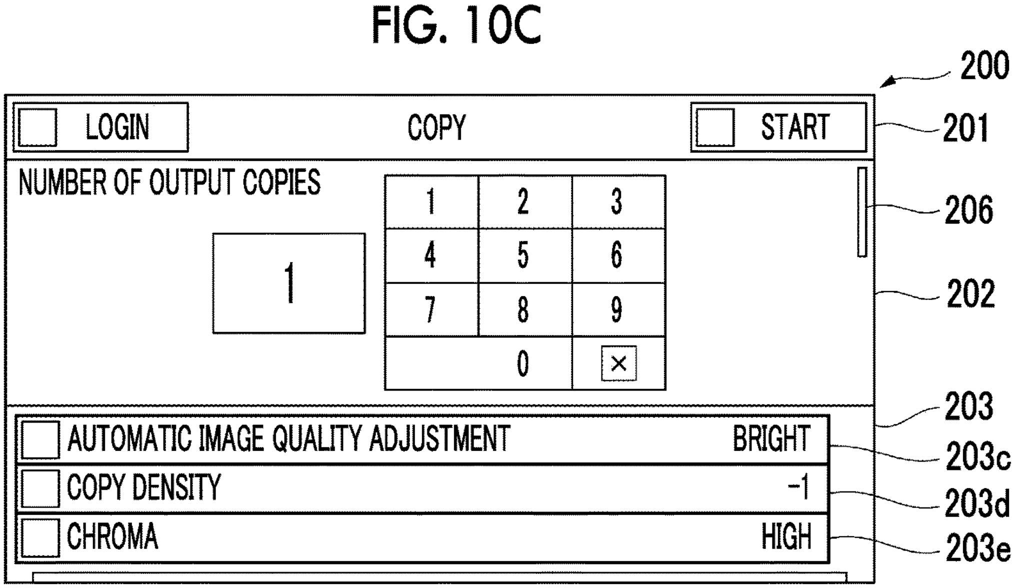

FIG. 10C

- LOGIN | COPY | START  — 200, 201
- NUMBER OF OUTPUT COPIES  — 206

| | 1 | 2 | 3 |
|---|---|---|---|
| 1 | 4 | 5 | 6 |
| | 7 | 8 | 9 |
| | | 0 | × |

— 202

- ☐ AUTOMATIC IMAGE QUALITY ADJUSTMENT — BRIGHT  — 203, 203c
- ☐ COPY DENSITY — -1  — 203d
- ☐ CHROMA — HIGH  — 203e

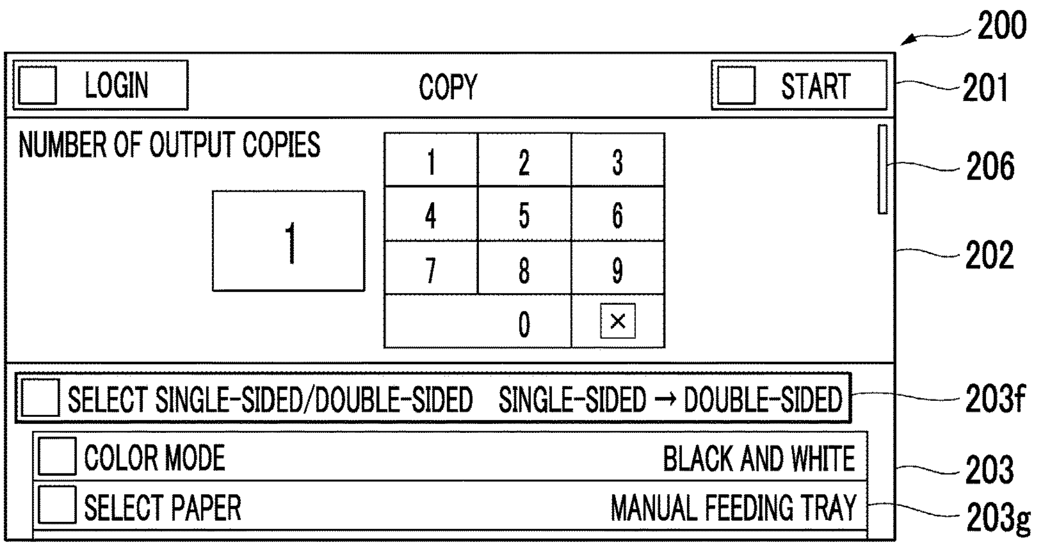

FIG. 12A

| LOGIN | COPY | START |

NUMBER OF OUTPUT COPIES: 1

| 1 | 2 | 3 |
| 4 | 5 | 6 |
| 7 | 8 | 9 |
|   | 0 | × |

☐ SELECT SINGLE-SIDED/DOUBLE-SIDED    SINGLE-SIDED → DOUBLE-SIDED — 203f
☐ COLOR MODE    BLACK AND WHITE — 203
☐ SELECT PAPER    MANUAL FEEDING TRAY — 203g

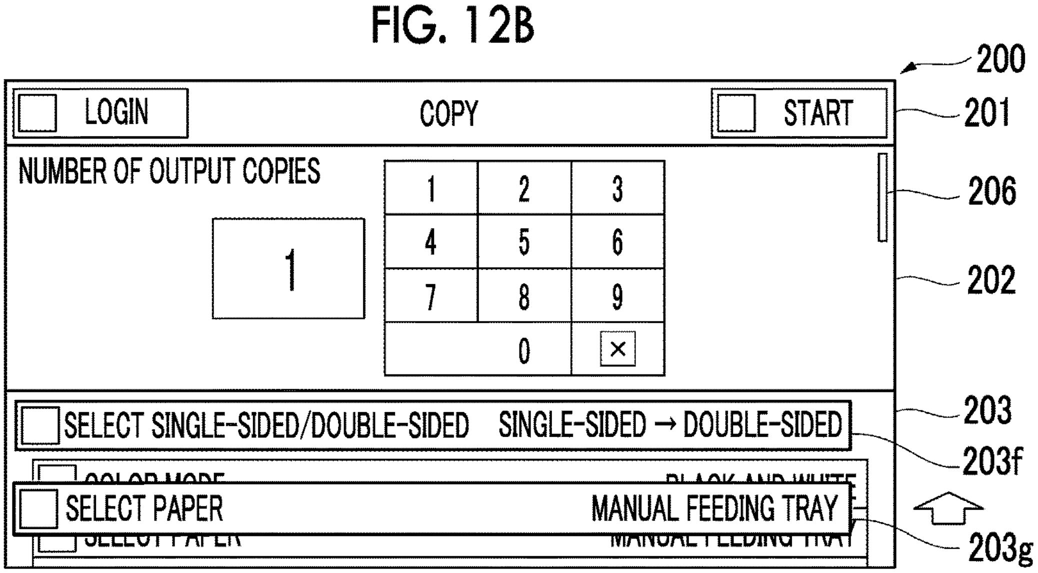

FIG. 12B

| LOGIN | COPY | START |

NUMBER OF OUTPUT COPIES: 1

| 1 | 2 | 3 |
| 4 | 5 | 6 |
| 7 | 8 | 9 |
|   | 0 | × |

☐ SELECT SINGLE-SIDED/DOUBLE-SIDED    SINGLE-SIDED → DOUBLE-SIDED — 203
☐ ~~COLOR MODE~~    ~~BLACK AND WHITE~~ — 203f
☐ SELECT PAPER    MANUAL FEEDING TRAY — 203g

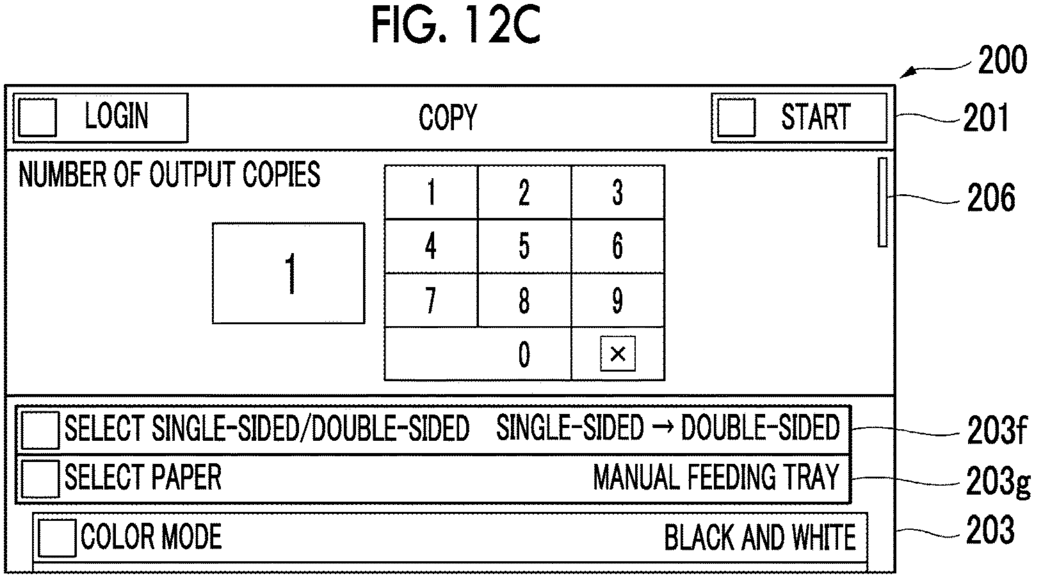

FIG. 12C

| LOGIN | COPY | START |

NUMBER OF OUTPUT COPIES: 1

| 1 | 2 | 3 |
| 4 | 5 | 6 |
| 7 | 8 | 9 |
|   | 0 | × |

☐ SELECT SINGLE-SIDED/DOUBLE-SIDED    SINGLE-SIDED → DOUBLE-SIDED — 203f
☐ SELECT PAPER    MANUAL FEEDING TRAY — 203g
☐ COLOR MODE    BLACK AND WHITE — 203

INTERFACE APPARATUS, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-030745 filed Feb. 22, 2019.

BACKGROUND

(i) Technical Field

The present invention relates to an interface apparatus, an information processing apparatus, and a non-transitory computer readable medium storing a program.

(ii) Related Art

In an operation screen (hereinafter, a setting screen) for performing a function setting of an electronic apparatus with a graphical user interface (hereinafter, GUI), in a case where the number of setting items increases, it takes time and effort to find a setting item on which a setting operation is to be performed. In particular, in a case of performing setting operations on a plurality of setting items, even in a case of trying to confirm a setting content of an item set in advance, it is necessary to search for a chosen setting item among a large number of setting items each time. In addition, in some cases, a setting for one setting item affects a setting content or a setting operation of another setting item. Even in this case, in order to check the affected setting item, it is necessary to search for a chosen setting item among a large number of setting items.

JP2017-130014A discloses a technology including a display unit, an operation input unit which inputs an operation of a user, and a control unit which causes the display unit to changeably display a first setting page and a second setting page and receives the input operation. In the technology, in a case where by receiving a change of a setting value of a first setting item in the first setting page, an inconsistency occurs between the first setting item of the first setting page and a setting value of a second setting item which is the second setting item of the second setting page and is not currently included a display area of a setting item of the second setting page, the control unit causes the display unit to display the second setting page in which the second setting item is disposed in the display area.

SUMMARY

In a case where there are many setting items on the setting screen, it takes time and effort to search for a chosen setting item. For this reason, in a case of checking a setting item having a changed setting content or a case where an inconsistency such as a conflict with one setting item occurs due to a change of another setting item, a task of searching for the setting item to check a target setting item becomes complicated.

Aspects of non-limiting embodiments of the present disclosure relate to an interface apparatus, an information processing apparatus, and a non-transitory computer readable medium storing a program capable of improving convenience of a user in an operation of searching for a setting item on a setting screen.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an interface apparatus includes: one or more processors programmed to: receive, from a user, designation of a setting change to at least one setting item; move, on a setting screen displayed on a display, the at least one setting item of which setting has been designated to change; and display, on the display, a movement of the at least one setting item of which setting has been designated to change from an original position to a position of a movement destination, wherein after the movement of the at least one setting item, the at least one setting item is displayed in a display manner different than a display manner in which other setting items are displayed.

BRIEF DESCRIPTION OF THE DRAWINGS

Exemplary embodiment(s) of the present invention will be described in detail based on the following figures, wherein:

FIGS. 4A to 4C are diagrams illustrating a display example of the setting screen;

FIG. 6A is a diagram illustrating a state in which a setting change for one setting item is performed; FIG. 6B a diagram illustrating a status in which the changed setting item is moved; and FIG. 6C is a diagram illustrating a state in which the movement of the setting item is completed;

FIG. 7A is a diagram illustrating a status in which a conflict setting item is moved; and FIG. 7B is a diagram illustrating a state in which the movement of the conflict setting item is completed;

FIG. 8A is a diagram illustrating a state in which a setting change for one setting item is released; FIG. 8C is a diagram illustrating a state in which the movement of the setting item is completed;

FIGS. 9A and 9B are diagrams illustrating a fourth display control example; FIG. 9A is a diagram illustrating a status in which a conflict setting item is moved based on a setting change release of a change setting item; and FIG. 9B is a diagram illustrating a state in which the movement of the conflict setting item is completed;

FIGS. 10A to 10C are diagrams illustrating a fifth display control example; FIG. 10A is a diagram illustrating a state in which a setting change for one setting item is performed; FIG. 10B is a diagram illustrating a status in which the changed setting item and a related setting item are moved; and FIG. 10C is a diagram illustrating a state in which the movement of the changed setting item and the related setting item is completed;

FIGS. 12A to 12C are diagrams illustrating a sixth display control example; FIG. 12A is a diagram illustrating an initial state in which a setting change is performed at a time of an operation start; FIG. 12B is a diagram illustrating a status in which a conflict setting item is moved; and FIG. 12C is a diagram illustrating a state in which the movement of the conflict setting item is completed.

DETAILED DESCRIPTION

Hereinafter, exemplary embodiments of the present invention will be described in detail with reference to drawings. The present exemplary embodiment is realized as an interface apparatus in an information processing apparatus, an information processing apparatus including the interface apparatus, a program for realizing a function of the interface apparatus, and the like. Hereinafter, a configuration in which an image processing apparatus is used as an example of the information processing apparatus and the present embodiment is applied as the interface apparatus will be described as an example.

System Configuration

Figure 1:
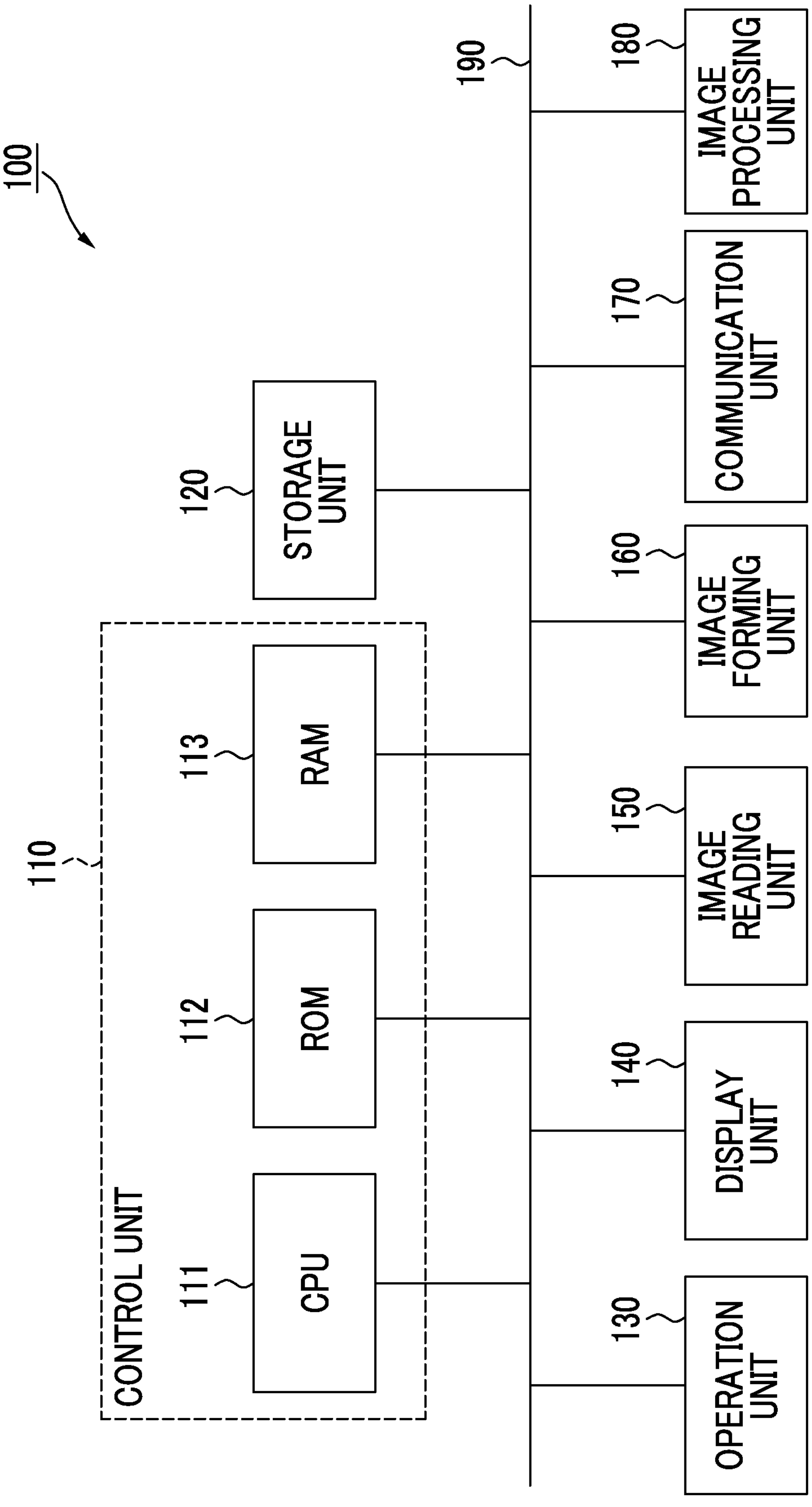
FIG. 1 is a diagram illustrating a functional configuration of an image processing apparatus as an example of an information processing apparatus to which the present exemplary embodiment is applied.

FIG. 1 is a diagram illustrating a functional configuration of an image processing apparatus as an example of an information processing apparatus to which the present exemplary embodiment is applied. An image processing apparatus 100 includes a central processing unit (CPU) 111, a read only memory (ROM) 112, and a random access memory (RAM) 113 constituting a control unit 110. In addition, the image processing apparatus 100 includes a storage unit 120, an operation unit 130, a display unit 140, an image reading unit 150, an image forming unit 160, a communication unit 170, and an image processing unit 180. Each of these functional units is connected to a bus 190, and exchanges data via the bus 190.

The operation unit 130 receives an operation of a user. The operation unit 130 is configured to include, for example, a touch sensor which outputs a control signal according to a position touched or pressed by a finger. An interface apparatus according to the present exemplary embodiment is configured to include a touch panel in which the touch sensor and a liquid crystal display constituting a display unit 140 to be described below are combined, and a display control unit 101 to be described below which controls display on the display unit 140.

The display unit 140 displays various screens. The display unit 140 is configured to include, for example, a liquid crystal display. Under control of the CPU 111, the display unit 140 displays various screens such as a screen for displaying information on a state of the image processing apparatus 100, a setting screen for performing a setting related to a function of the image processing apparatus 100, and the like.

The image reading unit 150 is configured to include a so-called scanner device, and optically reads an image on a set document and generates a read image (image data). As a method of reading an image, for example, a CCD method in which reflected light for light emitted from a light source to a document is reduced by a lens and received by charge coupled devices (CCDs), a CIS method in which reflected light for light emitted sequentially from a light emitting diode (LED) light source to a document is received by a contact image sensor (CIS), or the like is used.

The image forming unit 160 is an example of an image forming section, and forms an image based on image data by using an image forming material on a sheet, which is an example of a recording material. As a method of forming the image on the recording material, for example, an electrophotographic method in which a toner attached to a photosensitive member is transferred to the recording material so as to form an image, an ink-jet method in which an ink is discharged onto the recording material so as to form an image, or the like is used.

The communication unit 170 includes a network interface for connecting to an external apparatus via a network. As the network interface, for example, a network adapter, a wireless communication module, and the like are provided. In addition, in a case where the image processing apparatus 100 includes a facsimile function, a communication module for performing facsimile communication and the like is provided in the communication unit 170. Further, the communication unit 170 may have a module for performing communication by LTE or 3G.

The image processing unit 180 includes a processor as an arithmetic section and a working memory, and performs an image process such as color correction and gradation correction on an image represented by image data. The CPU 111 of the control unit 110 may be used as a processor, and the RAM 113 of the control unit 110 may be used as a working memory.

The storage unit 120 stores image data such as a read image or the like generated by the image reading unit 150. The storage unit 120 is configured to include, for example, a storage device such as a magnetic disk device or a non-volatile semiconductor memory.

Among the CPU 111, the ROM 112, and the RAM 113 constituting the control unit 110, the ROM 112 stores a program executed by the CPU 111. The CPU 111 reads the program stored in the ROM 112, and uses the RAM 113 as a work area so as to execute the program. Further, a program stored in the storage unit 120 may be read into the RAM 113, and the CPU 111 may execute the program read into the RAM 113. By the program being executed by the CPU 111, each of functional units of the image processing apparatus 100 described above is controlled and a data process is executed so as to realize the following functions.

Here, the program executed by the CPU 111 can be provided to the image processing apparatus 100 in a state of being stored in a computer-readable recording medium such as a magnetic recording medium (a magnetic disk or the like), an optical recording medium (an optical disc or the like), a semiconductor memory, or the like. In addition, the program executed by the CPU 111 may be provided to the image processing apparatus 100 via a network such as an internet.

Functional Configuration of Control Unit 110

Figure 2:
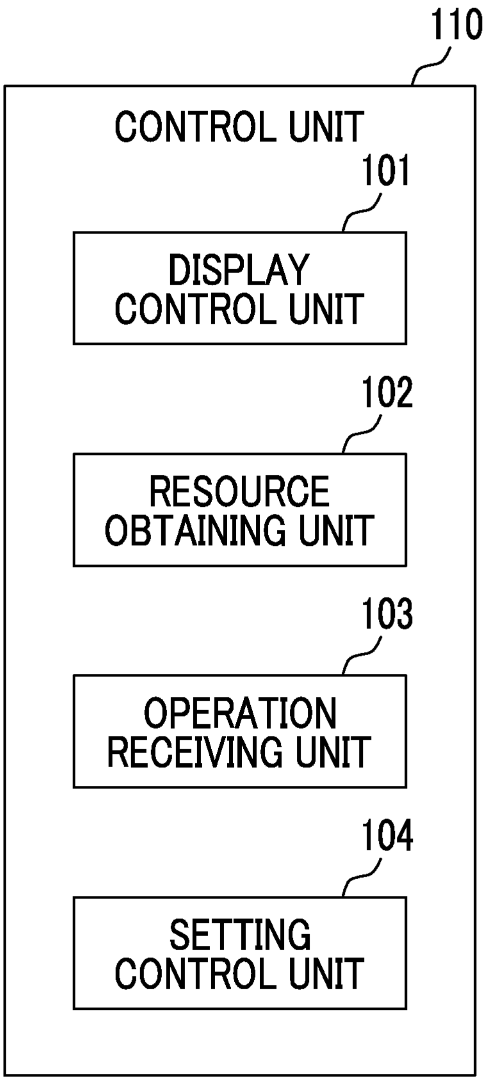
FIG. 2 is a diagram illustrating a functional configuration of a control unit.

FIG. 2 is a diagram illustrating a functional configuration of the control unit 110. The control unit 110 includes the display control unit 101, a resource obtaining unit 102, an operation receiving unit 103, and a setting control unit 104. FIG. 2 illustrates a characteristic configuration according to the present exemplary embodiment. Although not particularly illustrated, the control unit 110 has functions of controlling operations of the image reading unit 150, the image forming unit 160, the communication unit 170, and the like illustrated in FIG. 1. As described above, these functions are realized by the CPU 111 reading and executing the program stored in the ROM 112 or the like.

The display control unit 101 generates various screens such as a setting screen and the like and displays the screens on the display unit 140. The display control unit 101 processes a resource (a component) of a screen obtained by the resource obtaining unit 102 so as to generate a screen. The display control unit 101 includes, for example, a rendering engine. The display control unit 101 has a function of performing dynamic display of a screen being displayed on the display unit 140. The function is realized, for example, by periodically updating the resource constituting the screen being displayed on the display unit 140. A specific example of a function for realizing dynamic display of a screen includes a technology in which in a case where the screen is realized by a web application, dynamic display is realized on a browser by dynamically changing an attribute value of cascading style sheets (CSS) of each HTML element constituting the screen with JavaScript (trademark), for example.

The resource obtaining unit 102 obtains a resource constituting a screen displayed on the display unit 140. An example of the resource includes a text, an image, an object for receiving an operation of a user, and the like. Specifically, for example, in a case where the screen is realized by the web application, resources are prepared as a hyper text markup language (HTML) file, a CSS file, JavaScript, an image file, and the like. The resource is held in, for example, a storage section embedded in the image processing apparatus 100, an external database server, or the like. As the internal storage section, for example, the RAM 113, the storage unit 120, or the like of the control unit 110 may be used. The resource obtaining unit 102 reads a resource constituting a screen to be generated from the internal storage section or obtains the resource from the external database server by requesting the resource.

The operation receiving unit 103 receives an operation of the user to an operation object disposed on the screen displayed on the display unit 140, and notifies an operation content to the display control unit 101 and the setting control unit 104. An example of the operation on the operation object includes a pressing operation of a button and an object, a moving operation of a scroll bar, and the like. The display control unit 101 and the setting control unit 104 perform control according to information of the operation content received from the operation receiving unit 103.

The setting control unit 104 controls a setting related to a function of the image processing apparatus 100. Specifically, the setting control unit 104 holds information (hereinafter, setting information) on various setting contents in a case of controlling an operation of the image processing apparatus 100, and changes the held setting information in accordance with the setting operation received by the operation receiving unit 103. The setting information includes, for example, whether or not to use a specific function, a specific setting value (a numerical value), and the like. In addition, the setting control unit 104 determines whether a change in setting information (a setting content) related to a specific setting item affects a setting content of another setting item. In a case of affecting the setting content, the setting control unit 104 changes setting information of the other setting item. As an example, there are a plurality of functions which cannot be simultaneously selected (conflict with each other) in a case of performing an operation according to a specific function, and in a case where one of the functions is selected by setting, the one function is set such that the one function cannot be selected according to another function. According to a type of the image processing apparatus 100, a configuration of the apparatus, or the like, it is concretely specified how change of setting information (a setting content) related to a certain setting item affects which setting item.

Configuration of Setting Screen

Next, a setting screen displayed on the display unit 140 by control of the display control unit 101 will be described. The setting screen is a screen for presenting a setting item related to a function of the image processing apparatus 100 and receiving a change in a setting content of the selected setting item in accordance with an operation of the user. Hereinafter, a configuration and a display mode of the setting screen will be described in detail.

Figure 3:
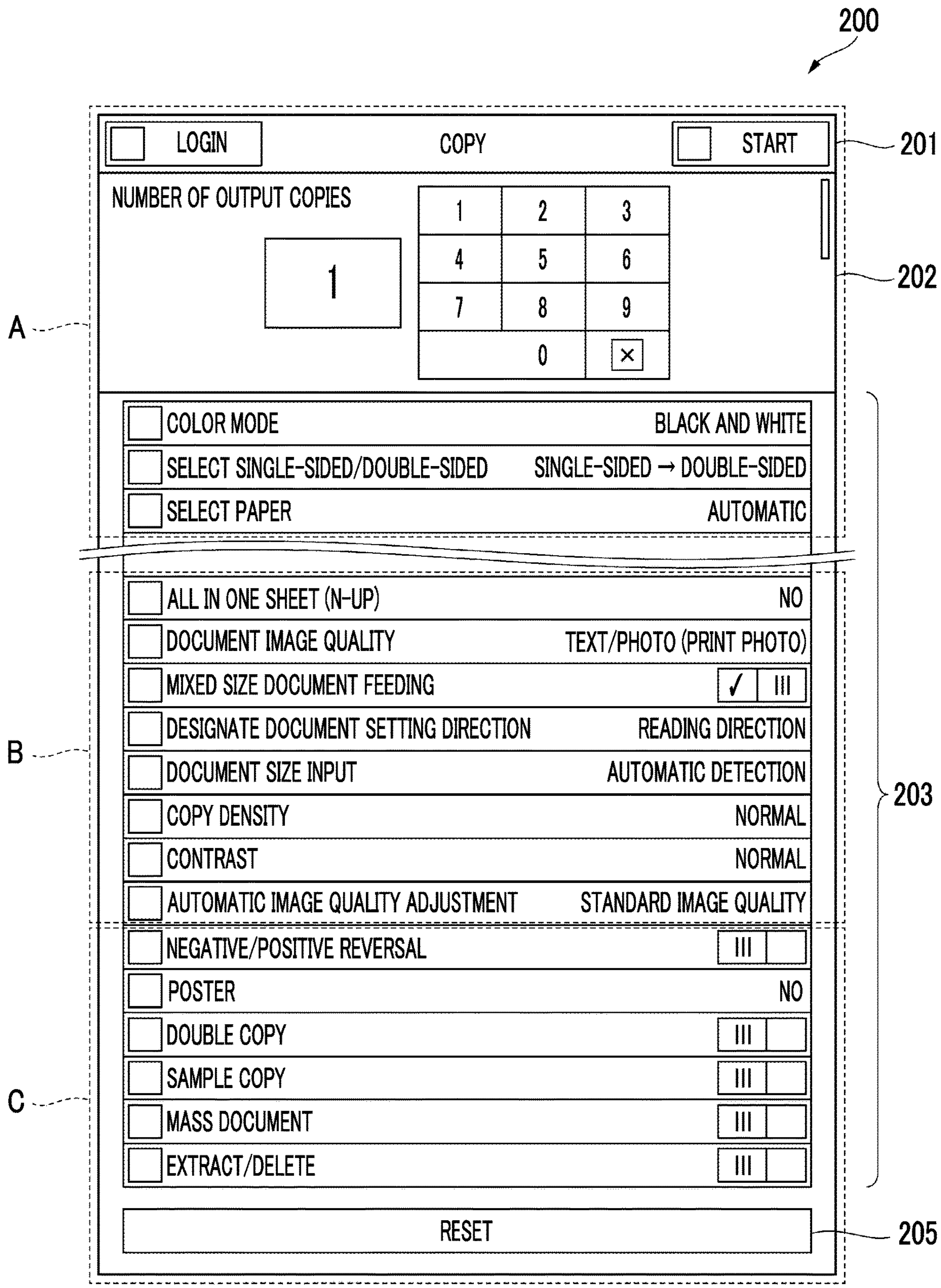
FIG. 3 is a diagram illustrating a configuration example of a setting screen.

FIG. 3 is a diagram illustrating a configuration example of a setting screen. A setting screen 200 is prepared for each of functions of the image processing apparatus 100. However, although the setting screen 200 with each function has different items displayed in display fields of setting items, a screen configuration is common. Here, the setting screen 200 with a copy function will be described as an example.

The setting screen 200 illustrated in FIG. 3 includes a header 201, a basic setting field 202, a menu display field 203, and a footer 205. Since setting items for functions to be set are displayed on the setting screen 200, a screen size increases as the number of setting items increases. Therefore, in some cases, in a case where the setting screen 200 is displayed on the display unit 140, only a part of the setting screen 200 may be displayed. In this case, for example, the entire setting screen 200 can be browsed by moving a display area displayed on the display unit 140 by using a scroll function or the like of a screen.

The header 201 provides information on the setting screen 200 itself, an operation section for a function corresponding to the setting screen 200, and the like. In the example illustrated in FIG. 3, a function name of "copy" is displayed, and an operation button of "login" for calling a user authentication function and an operation button of "start" for starting execution of a copy operation are disposed. In a case where the setting screen 200 is displayed on the display unit 140, the header 201 is fixedly displayed at a specific position on the display unit 140 even in a case where the display area is moved by the scroll function. The display contents and disposition of the header 201 illustrated in FIG. 3 are only examples, and in practice, various contents generally displayed in the header on the operation screen or the like may be displayed in various designs.

The basic setting field 202 is a display field specifically provided to display a major setting item with a function to be set on the setting screen 200. The basic setting field 202 is displayed at a top of the configuration of the setting screen 200 excluding the header 201. Therefore, a setting item displayed in the basic setting field 202 is always disposed at the top among setting items which can be set on the setting screen 200. Further, in the basic setting field 202, an operation object for performing a setting operation (changing, selecting, or the like setting information) on the displayed setting item may be displayed. In the example illustrated in FIG. 3, as a setting item of the basic setting field 202, "the number of output copies" is assigned, and a numerical value (a setting value) of the number of output copies and a keyboard which is an operation object for setting the number of copies are displayed. Since the number of output copies is a fundamental and major setting item in a case of using the copy function, the numerical value and the keyboard are displayed. The basic setting field 202 is not a fundamental component in the setting screen 200. In some cases, according to a type of the function, there may be no setting item to be treated as the basic setting field 202 as distinguished from other setting items. In addition, in some cases, a design, in which no special display such as the basic setting field 202 is performed on a specific setting item, may be adopted as a user interface.

The menu display field 203 is a display field in which a list of a setting item with a function to be set on the setting screen 200 is displayed. The setting item displayed in the menu display field 203 is an item other than a setting item assigned to the basic setting field 202. In the example illustrated in FIG. 3, all setting items are simply arranged without hierarchizing or classifying the setting items. In a display field for each setting item, a setting item name and the current setting information are displayed. The display field of each setting item doubles as an operation object for calling a setting change receiving section which receives a setting change of the corresponding setting item. That is, in a case where an operation to select a display field of a specific setting item is performed, the setting change receiving section of the setting item is activated.

The setting change receiving section may have various configurations according to a type of the setting item. For example, it is considered to display a list of selectable settings for the corresponding setting item, display a text box for inputting a numerical value or a text, or display a button object for designating whether or not to execute a function related to the setting item. Further, an example of a display method of the setting change receiving section may include various methods such as a display by a drop-down menu, display switching to another screen, and the like.

The footer 205 displays an item for performing an operation on the setting screen 200 itself, which does not depend on a type of a function. In the example illustrated in FIG. 3, the footer 205 displays an operation button of "reset" which returns setting information of each setting item to an initial state. In a case where the operation of the illustrated operation button of "reset" is performed, the setting information in each setting item of the setting screen 200 is returned to the initial value. In addition to the illustrated operation button of "reset", an operation object such as an operation button for storing the current setting item as an initial display item, an operation button for moving the displayed setting item to an operation screen so as to change the displayed setting item, an operation button for checking a use in a case of using the copy function, or the like is disposed in the footer 205. In a case where the setting screen 200 is displayed on the display unit 140, the footer 205 may move along with movement of a display area displayed on the display unit 140 by the scroll function, and may be fixedly displayed at a specific position of the display unit 140 in the same manner as the header 201.

Display Example of Setting Screen

FIGS. 4A to 4C are diagrams illustrating a display example of the setting screen 200. FIG. 4A is a diagram illustrating a state in which an area A (an area indicated by a dashed frame A) of the setting screen 200 illustrated in FIG. 3 is displayed, FIG. 4B is a diagram illustrating a state in which an area B (an area indicated by a dashed frame B) of the setting screen 200 illustrated in FIG. 3 is displayed, and FIG. 4C is a diagram illustrating a state in which an area C (an area indicated by a dashed frame C) of the setting screen 200 illustrated in FIG. 3 is displayed.

In the display examples illustrated in FIGS. 4A, 4B, and 4C, a scroll bar 206 which transmits the setting screen 200 in a vertical direction is displayed, and by operating the scroll bar 206 to move a display area displayed on the display unit 140, the entire setting screen 200 can be browsed. In addition, in the illustrated display example, the footer 205 moves as the display area moves, along with the menu display field 203. In the example illustrated in FIG. 4A, in a case where a setting item of "color mode" is selected in the menu display field 203, a drop-down menu 204 as a setting change receiving section is displayed. As a setting of "color mode", any one of "automatic", "full color", "black and white", and "two colors" can be selected, and "black and white" is selected in the illustrated example.

Relationship Between Setting Items

Next, a relationship between setting items will be described. In some cases, in a case where a setting change is performed on one setting item, the setting change may affect settings of other setting items. For example, in a case where there are a plurality of functions which cannot be simultaneously executed, in a case where one function to be executed is selected and set among the functions, it is not possible to select a setting for executing other functions. In addition, when there is a function which can be executed only when a certain setting item is a specific setting, in a case where the function is selected and set to be executed, setting information of the setting item is set to the specific setting. In some cases, there are a plurality of other setting items which affect a setting of one setting item, or there are a plurality of other setting items which are affected in a case where one setting item is set to a specific setting. A relationship between the setting items may be variously determined for each setting item according to an apparatus configuration of the image processing apparatus 100, authority of the user, or the like.

Further, in some cases, in the relationship between the setting items, superiority and inferiority may be specified between the setting items.

For example, between two setting items in which one setting affects the other setting, one with a higher priority is set as a first setting item, and the other one with a lower priority is set as a second setting item. In this case, a setting of the second setting item always follows a setting of the first setting item. That is, in a case where the setting of the first setting item is changed, the setting of the second setting item is changed, as necessary, so as to correspond to the setting of the changed first setting item. In the second setting item, it is prohibited that a setting inconsistent with (conflicting with) the setting of the first setting item is performed. On the other hand, the setting of the first setting item can be changed regardless of the setting content of the second setting item. That is, in the first setting item, after the setting of the second setting item is changed, it is permitted that the setting inconsistent with (conflicting with) the setting of the changed second setting item is performed. The superiority or inferiority between the setting items is individually specified among the individual setting items. That is, in some cases, one setting item has a high priority to another setting item and a low priority to another setting item.

Mode of Setting Change

Next, a mode of a setting change based on the relationship between the setting items as described above will be described. In the following description, a setting item having setting information changed by an operation of the user is referred to as a change setting item. A setting item having setting information affected by a change in setting information of a certain setting item is referred to as a related setting item. Among related setting items, a setting item which cannot be selected on the setting screen 200 is particularly referred to as a conflict setting item, as an influence of the occurrence of the change setting item.

Regarding two setting items (setting items A and B), in some cases, in a case of setting information of the setting item A is changed, setting information of the setting item B is affected, but even in a case where the setting information of the setting item B is changed, the setting information of the setting item A is not affected. That is, in some cases, although the setting item B is a related setting item for the setting item A, the setting item A is not a related setting item for the setting item B.

As modes of a setting change based on a relationship between setting items, generally, three modes of a setting change by forward priority, a setting change by backward priority, and a setting change at a time of an operation start can be considered. In addition, in some cases, based on a setting change by backward priority, a setting change by forward priority is released. In both of the setting change by forward priority and the setting change by backward priority, a setting item of which a setting change is firstly performed is a change setting item, and a setting item of which a setting change is automatically performed later is a related setting item.

A setting change by forward priority means that another setting item affected by the setting change of the setting item firstly performed is forcibly and automatically changed. In this case, out of the change setting item and the related setting item, the change setting item has higher priority. In a case where the setting change by forward priority is performed, after then, a setting change, related to the related setting item, conflicting with a setting of the change setting item cannot be performed. In particular, in a case where an execution of a function related to the related setting item conflicts with the setting of the change setting item (that is, the related setting item is a conflict setting item), it becomes impossible to select the related setting item itself.

A setting change by backward priority means that another setting item affected by the setting change of the setting item performed later is forcibly and automatically changed. In this case, there is no superiority and inferiority between the change setting item and the related setting item. In a case where the setting change by backward priority is performed, a setting change can be performed on the related setting item of which setting is changed later regardless of a setting content of the change setting item. In the setting change by backward priority, in a case where a setting content of the related setting item set later conflicts with a setting content of the change setting item set firstly, setting information of the change setting item is changed so as not to conflict with setting information of the related setting item.

As described above, in some cases, there are a plurality of related setting items for one change setting item. In this case, priority for a change setting item may be different for each related setting item. That is, among the plurality of related setting items, some have higher priority than a change setting item and there is no superiority and inferiority between others, further some others have lower priority than the change setting item. In some cases, in these setting items, the setting change by forward priority and the setting change by backward priority are combined. Hereinafter, a specific example will be described.

Regarding four setting items (setting items A, B, C, and D), it is considered a case where there are the setting item A>the setting item B=a setting item C>a setting item D in descending order of priority and a setting change is performed on the setting item B. In addition, in a case where the setting item B is a change setting item, all of the setting item A, the setting item C, and the setting item D are related setting items. Further, in a case where after the setting change is performed on the setting item B, a setting change is performed on any of the setting item A, the setting item C, and the setting item D, a mode differs depending on whether or not a setting of the setting item B is affected by the setting change of the setting item A, the setting item C, and the setting item D. In a case where the setting item B is not affected by the setting change of any of the setting item A, the setting item C, and the setting item D, a setting change by backward priority is not established since the setting item B is not a related setting item. A case where the setting item B is affected by the setting change of any of the setting item A, the setting item C, and the setting item D will be individually described.

In the above relationship, since the setting item A has higher priority out of the setting items A and B, a setting change can be performed on the setting item B only within a range not conflicting with the current setting of the setting item A. In this case, since the setting change of the setting item B does not affect the setting of the setting item A, a setting change by forward priority is not established. In a case where the setting of the setting item A is changed after changing the setting item B, in a case where the setting item B is a related setting item when the setting item A becomes a change setting item, a setting change is performed so that the setting item B corresponds to the setting item A after the setting change, and a setting change by backward priority is established.

Next, since there is no superiority and inferiority between the setting items of the setting items B and C, a setting change can be performed on the setting item B regardless of the current setting of the setting item C. The setting of the setting item C is affected by contents of the setting change of the setting item B. For this reason, a setting change by forward priority is established. In a case where the setting of the setting item C is changed after changing the setting item B, in a case where the setting item B is a related setting item when the setting item C becomes a change setting item, a setting change is performed so that the setting item B corresponds to the setting item C after the setting change, and a setting change by backward priority is established.

Next, since the setting item B has higher priority out of the setting items B and D, in a case where a setting of the setting item B is changed, a setting change is performed so that the setting item D corresponds to the setting item B after the setting change, and a setting change by forward priority is established. A setting change can be performed on the setting item D only within a range not conflicting with the current setting of the setting item B. In this case, since the setting change of the setting item D does not affect the setting of the setting item B, a setting change by backward priority is not established regardless of whether the setting item B is a related setting item when the setting item D becomes a change setting item.

In addition, as described above, in a case where setting changes by forward priority and backward priority are combinedly performed on the change setting item and the plurality of related setting items, in some cases, by performing the setting change by backward priority, the setting change by forward priority is released. For example, in the example described above, it is assumed that a setting change by forward priority is established in the setting item D by performing a setting change on the setting item B, and then, a setting change by backward priority is established in the setting item B by performing a setting change on the setting item A. At this time, in some cases, according to a content of the setting change by backward priority in the setting item B, a setting of the setting item B is deleted so as to limit the setting change of the setting item D. In this case, after the setting change by backward priority, the setting change can be performed on the setting item D without being limited by the setting of the setting item B.

A setting change at a time of an operation start means a setting change performed in a case where a setting change is performed on a certain setting item (single item or a plurality of items) and an operation of the image processing apparatus 100 based on the setting is started, there is a conflict between a plurality of setting items. Although the conflict occurs in the plurality of setting items including the setting item with the changed setting according to a configuration or an operation state of the image processing apparatus 100, in some cases, the conflict cannot be detected at a time of the setting change.

For example, it is assumed that a setting of a size of a sheet is performed by selecting a tray in which the sheet is to be set. When the operation state of the image processing apparatus 100 is in a power saving state, it is assumed that it is possible to perform a setting change on the sheet size, but a sensor for recognizing which tray is selected is not operated. Here, it is considered a case where the image processing apparatus 100 is in the power saving state, an executable function only for a specific sheet size is set to be used as one setting item, and a sheet size setting is set to a paper size different from the specific sheet size. In this case, a setting of the function to be used conflicts with the setting of the sheet size. However, when the image processing apparatus 100 is in the power saving state, since the selected tray cannot be recognized, the conflict of the setting cannot be detected and the setting change by forward priority or the setting change by backward priority described above is not performed.

In this case, at a time when the operation state of the image processing apparatus 100 shifts from the power saving state to a normal state and an operation based on the function to be used is started, the above setting conflict is detected. Therefore, at this time, it is necessary to change a setting of any setting item so as to resolve the setting conflict. However, in many cases, it is not possible to mechanically determine which setting of setting items conflicting with each other is changed. For example, in the example described above, in a case where there is no tray corresponding to the specific sheet size used by the set function, a setting for using the function is invalid. Therefore, it is impossible not to receive a setting of the setting item of the sheet size recognized at a time of an operation start. In this case, the setting items conflicting with each other are presented to the user, and a setting change by the user for resolving the conflict is received.

As described above, in a case where a setting change for one setting item is performed based on a relationship between the setting items, a setting change in the related setting item may be combinedly performed. However, in either case, focusing on two setting items, in a case where one is a change setting item and the other is a related setting item, the setting change is a setting change which occurs individually according to priority between the setting items, and only a plurality of sets of setting items are combined.

Display Control of Setting Screen

Next, display control of the setting screen 200 (see FIGS. 4A to 4C) in a case where a setting change is performed will be described. In a case where a setting change is performed on the setting screen 200, the display control unit 101 (see FIG. 2) of the control unit 110 changes a display position in the menu display field 203 of a setting item of which setting is changed. Setting items to be moved are both of the setting item of which setting is changed by the user (a change setting item) and another setting item affected by the setting change by the user (a related setting item). In order to easily and visually recognize the movement of the setting item and a movement destination, the display control unit 101 displays the movement of the setting item from an original position to the position of the movement destination by using a moving image expression.

The movement destination of the setting item of which setting is changed differs according to the setting item being a change setting item, a related setting item, and a conflict setting item. Specifically, a change setting item is moved to a top (a head) in the menu display field 203. Among related setting items, a setting item other than a conflict setting item is moved to the next of the change setting items in the menu display field 203 (a position following the change setting item). In a case where there are a plurality of related setting items, a layout order is determined based on a predetermined reference. For example, the setting items may be arranged in order from the upper setting items of an original layout position in the menu display field 203. A conflict setting item is moved to a bottom (an end) in the menu display field 203. In the following description, it is assumed that a related setting item which is not a conflict setting item is distinguished from a conflict setting item, and when simply referred as a related setting item, the related setting item means a related setting item which is not a conflict setting item.

Further, in order to visually indicate that the moved setting items (a change setting item, a related setting item, a conflict setting item) are setting items of which setting is changed, the moved setting items may be displayed (highlighted) in a display mode different from that of the other setting items. As highlighting, various expressions such as a font and a decoration of a text, a change of a color to be displayed or the like, a change of a background color and pattern, a change of a display size, a dynamic change of light and dark, blinking, and the like can be used. Regarding a conflict setting item, as highlighting indicating that the setting item cannot be selected and changed, grayed out or the like may be displayed. Hereinafter, regarding display control of the setting screen 200 by the display control unit 101, a flow of the process will be described with reference to the flowcharts, and some specific examples will be described by using display examples.

Figure 5:
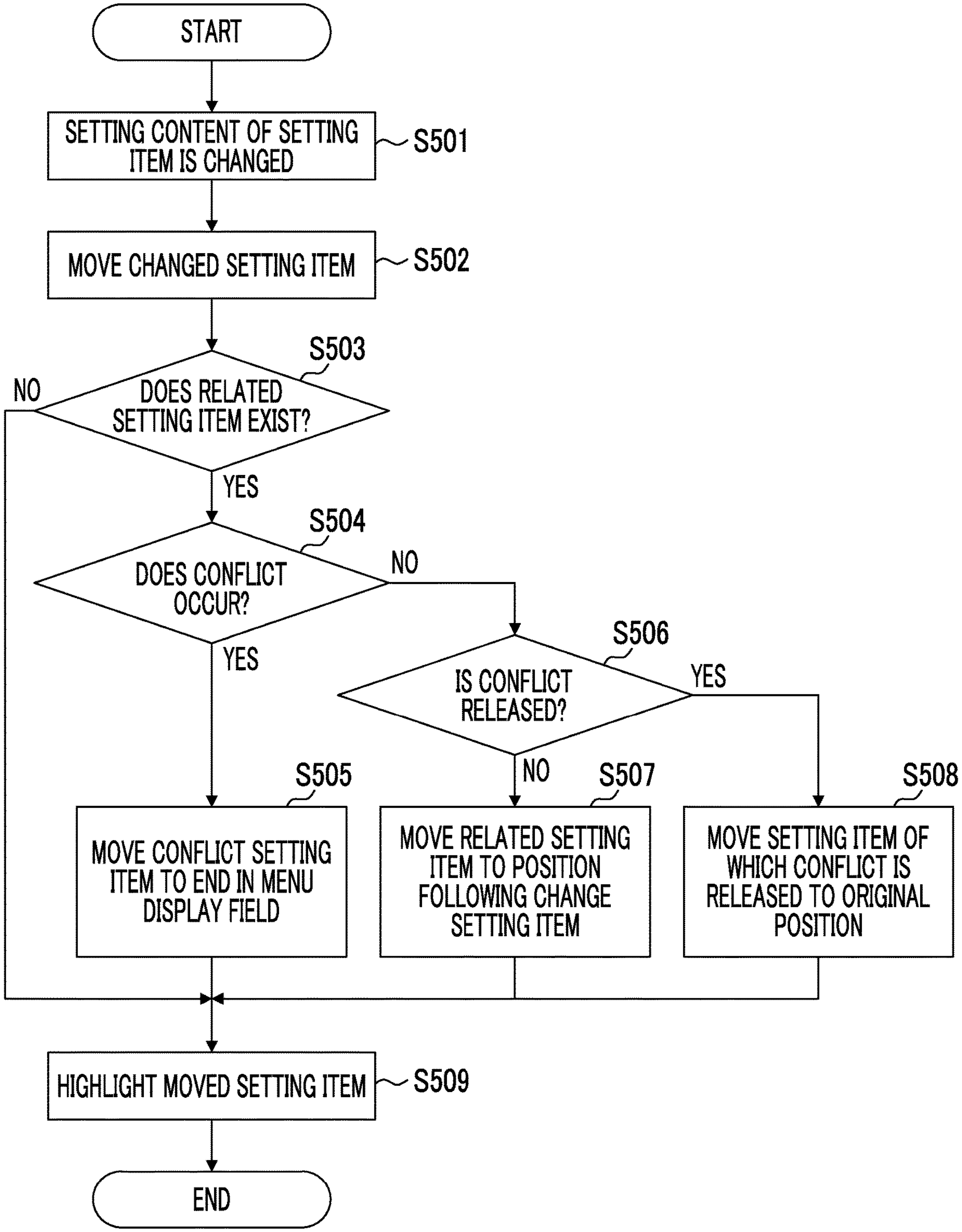
FIG. 5 is a flowchart illustrating display control of a setting screen by a display control unit in a case where a setting operation by a user is received.

FIG. 5 is a flowchart illustrating display control of the setting screen 200 by the display control unit 101 in a case where a setting operation by a user is received. The display control unit 101 causes the display unit 140 to display the setting screen 200, and waits for the setting operation by the user. In a case where the user operates the operation unit 130 to perform a setting change, information of an operation content received by the operation receiving unit 103 is notified to the display control unit 101 and the setting control unit 104. The setting control unit 104 changes a setting according to the received operation content.

In a case where a setting content of any setting item is changed by the user operation (S501), the display control unit 101 moves the setting item (a change setting item) on which the setting change is performed (S502). As described above, the change setting item is moved to a top in the menu display field 203.

Next, the display control unit 101 obtains information of a related setting item (including a conflict setting item) from the setting control unit 104. In a case where there is no related setting item (including the conflict setting item) (No in S503), the display control unit 101 highlights the moved change setting item and terminates the process (S509).

In a case where there is a related setting item (including a conflict setting item) (YES in S503), the display control unit 101 obtains information on whether a conflict is caused by the related setting item (whether or not the related setting item is a conflict setting item) from the setting control unit 104. The operations subsequent to S503 are performed for each related setting item (including a conflict setting item) which occurs in a case where the setting change of the setting item is performed by the user operation (the change setting item occurs). That is, in a case where there is a plurality of related setting items (including conflict setting items), the following processing is performed for each related setting item (including the conflict setting item).

Based on the information obtained from the setting control unit 104, in a case where the conflict occurs (YES in S504), the display control unit 101 moves the conflict setting item to an end (a bottom) in the menu display field 203 (S505). The display control unit 101 highlights the moved change setting item and conflict setting item, and terminates the process (S509).

In a case where a conflict does not occur (NO in S504), the display control unit 101 obtains information on whether or not the conflict which exists until then between setting items is released, from the setting control unit 104. In a case where the conflict is not released (NO in S506), the display control unit 101 moves a related setting item to a position (directly below) following the change setting item in the menu display field 203 since the related setting item is a new related setting item generated by the occurrence of the change setting item (S507). The display control unit 101 highlights the moved change setting item and related setting item, and terminates the process (S509).

In a case where the conflict is released (YES in S506), the related setting item is a setting item which is not a conflict setting item since the setting change is performed. Since the conflict setting item before the release is positioned at a bottom in the menu display field 203 (see S505), the display control unit 101 moves the related setting item of which conflict is released to an original position in the menu display field 203. (S508). The display control unit 101 highlights the moved change setting item and related setting item, and terminates the process (S509).

Figure 6A:
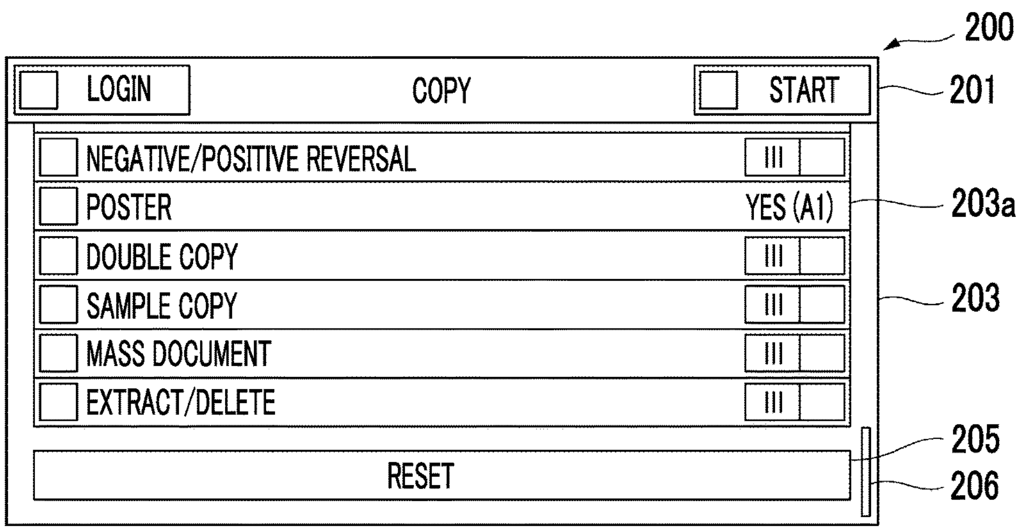
FIGS. 6A to 6C are diagrams illustrating a first display control example.
Figure 6B:
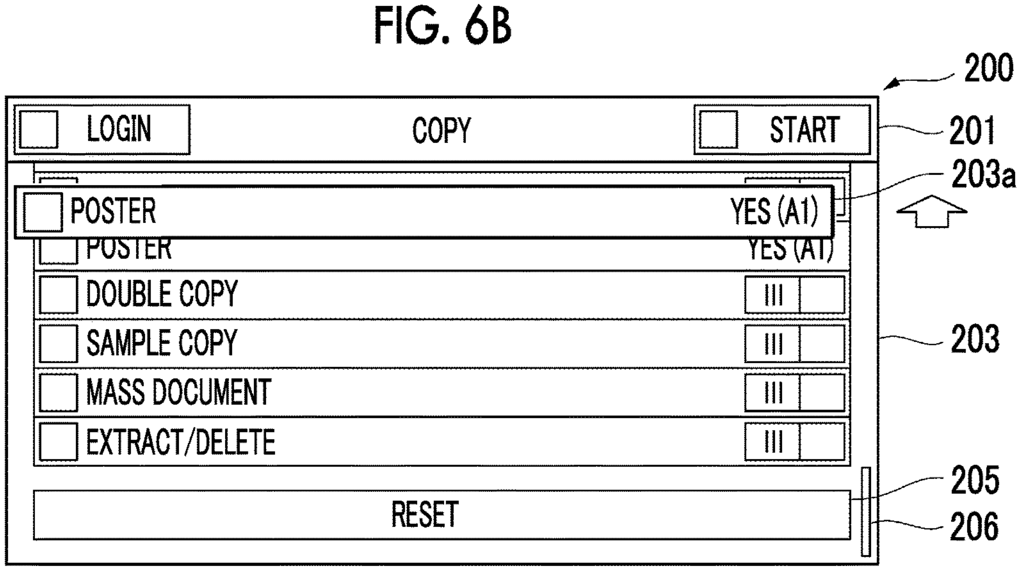
Figure 6C:
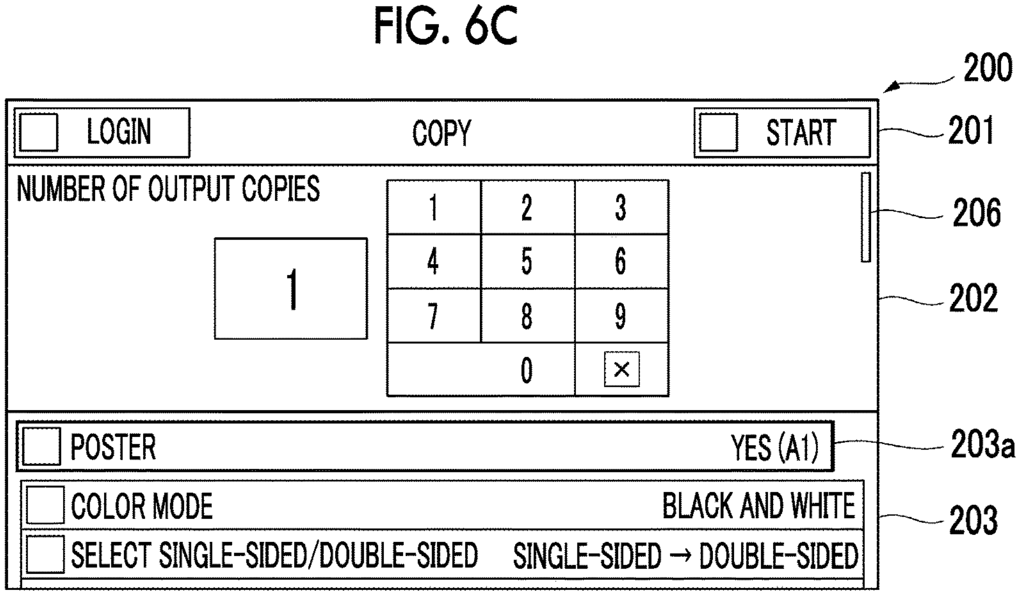

FIGS. 6A to 6C are diagrams illustrating a first display control example. FIG. 6A is a diagram illustrating a state in which a setting change for one setting item is performed, FIG. 6B a diagram illustrating a status in which the changed setting item is moved, and FIG. 6C is a diagram illustrating a state in which the movement of the setting item is completed. In the example illustrated in FIGS. 6A to 6C, a display example in a case where a setting change of a setting item of "poster" is performed (that is, the setting item of "poster" becomes a change setting item) is illustrated. The setting item of "poster" is a setting item for setting whether or not to use a function of dividing one document into a plurality of sheets and enlargedly copying the document. In the example illustrated in FIG. 6A, a state in which a setting change for outputting an A1 size image is performed by using the function of "poster" is illustrated.

In a case where a setting change is performed on the setting item of "poster", as illustrated in FIG. 6B, the display control unit 101 moves an operation object 203*a* of the setting item of "poster" in the menu display field 203 upward of the menu display field 203 (see the arrow in the diagram). As illustrated in FIG. 6C, the display control unit 101 disposes the operation object 203*a* of the setting item of "poster" at a top in the menu display field 203. Further, as illustrated in FIGS. 6B and 6C, the display control unit 101 highlights the operation object 203*a* of the moved setting item of "poster" (in the illustrated example, displayed in a thick frame and displayed by being shifted to the left than other operation objects).

Figure 7A:
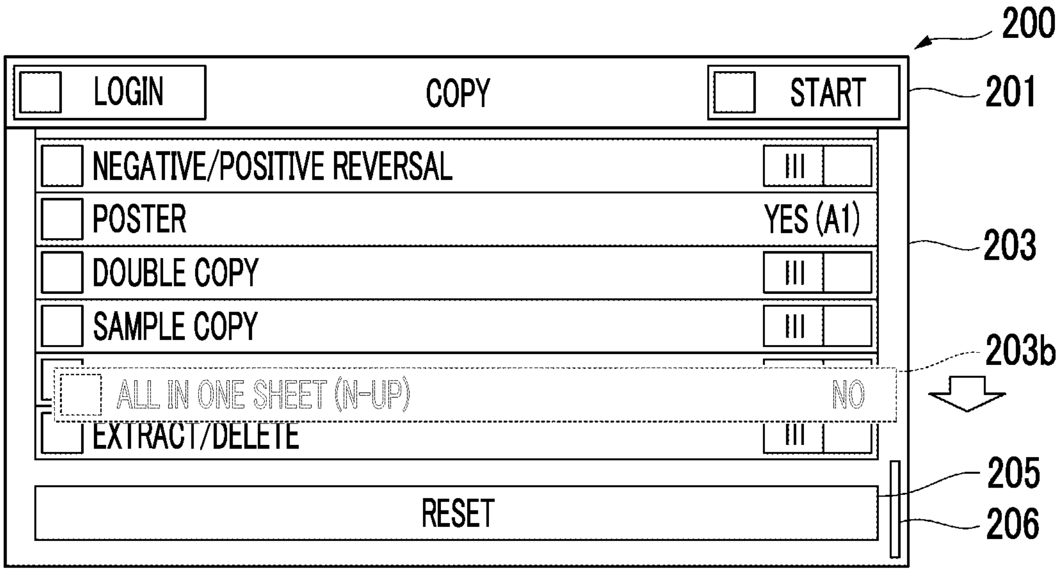
FIGS. 7A and 7B are diagrams illustrating a second display control example.
Figure 7B:
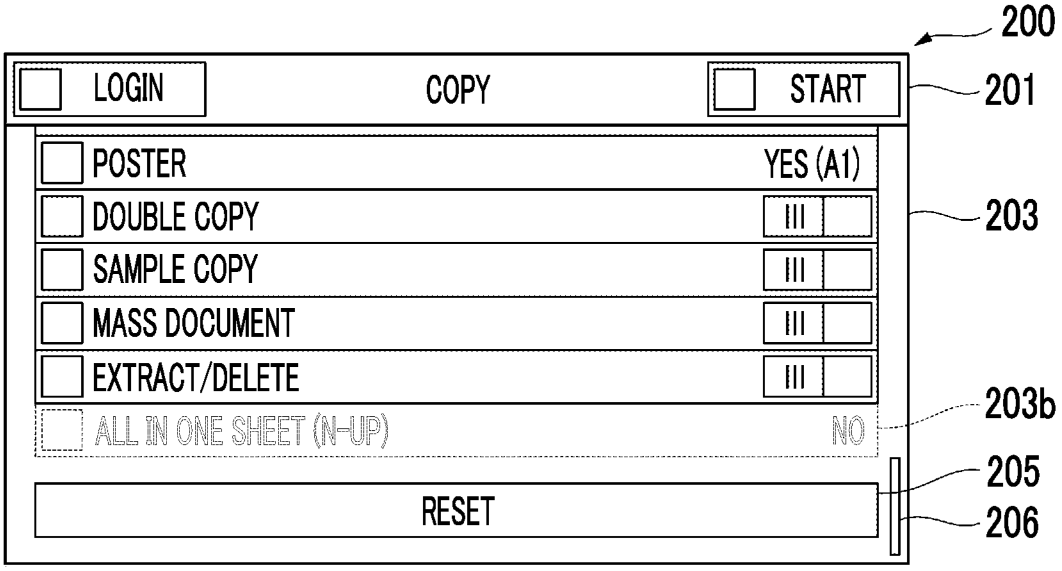

FIGS. 7A and 7B are diagrams illustrating a second display control example. FIG. 7A is a diagram illustrating a status in which a conflict setting item is moved, and FIG. 7B is a diagram illustrating a state in which the movement of the conflict setting item is completed. In the example illustrated in FIGS. 7A and 7B, an example of display control of a setting item of "all in one sheet (N-up)" is illustrated. As described above, in a function of the setting item of "poster", one document is divided and output on a plurality of sheets. Therefore, it is not possible to simultaneously use a function of the setting item of "all in one sheet (N-up)" and the function of the setting item of "poster" for outputting a plurality of documents on one sheet. That is, in a case of performing a setting change for using the function of the setting item of "poster" (the setting item of "poster" is a change setting item), the setting item of "all in one sheet (N-up)" is a conflict setting item. Here, in a case where the setting item of "poster" is selected, it is assumed that forward priority for the setting item of "all in one sheet (N-up)" is established. Therefore, in a case where the function of the setting item of "poster" is selected to be used, it is not possible to perform a setting change on the setting item of "all in one sheet (N-up)".

In a case where a setting change is performed on the setting item of "poster", as illustrated in FIG. 7A, the display control unit 101 moves an operation object 203*b* of the conflict setting item of "all in one sheet (N-up)" in the menu display field 203 downward of the menu display field 203 (see the arrow in the diagram). As illustrated in FIG. 7B, the display control unit 101 disposes the operation object 203*b* of the conflict setting item of "all in one sheet (N-up)" at a bottom in the menu display field 203. In addition, as illustrated in FIGS. 7A and 7B, the display control unit 101 performs highlighting indicating that a setting change cannot be performed on the operation object 203*b* of the moved conflict setting item of "all in one sheet (N-up)" (in the illustrated example, a border and a text of the operation object 203*b* are displayed by dotted lines).

Figure 8A:
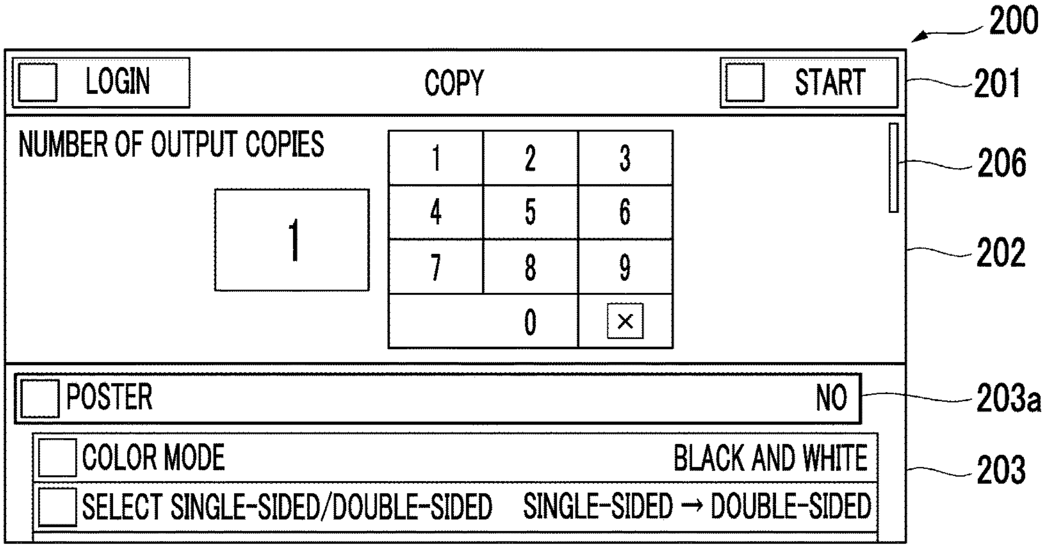
FIGS. 8A and 8C are diagrams illustrating a third display control example.
Figure 8B:
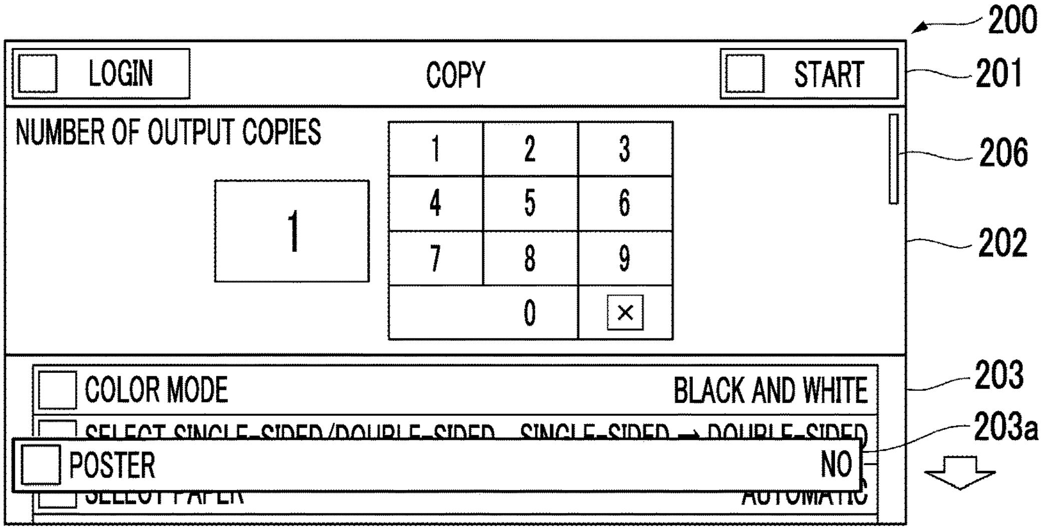
FIG. 8B a diagram illustrating a status in which the changed setting item is moved.
Figure 8C:
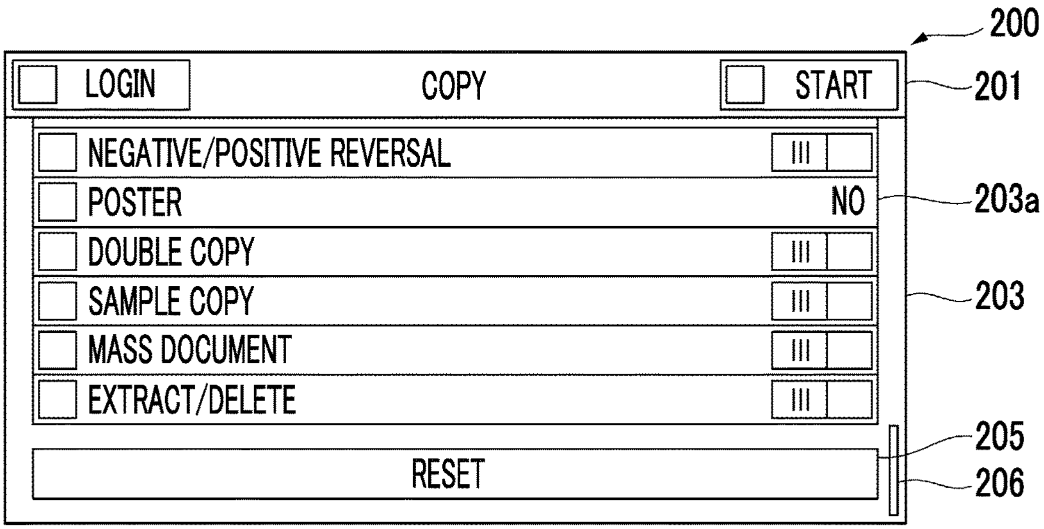

FIGS. 8A and 8C are diagrams illustrating a third display control example. FIG. 8A is a diagram illustrating a state in which a setting change for one setting item is released, FIG. 8B a diagram illustrating a status in which the changed setting item is moved, and FIG. 8C is a diagram illustrating a state in which the movement of the setting item is completed. In the example illustrated in FIGS. 8A and 8C, a display example in a case where the setting change of the setting item of "poster" of which setting is changed in the example of FIGS. 6A to 6C is released. The example illustrated in FIG. 8A illustrates that a setting is performed not to use the function of "poster".

In a case where the setting change is performed on the setting item of "poster", as illustrated in FIG. 8B, the display control unit 101 moves the operation object 203*a* of the setting item of "poster" in the menu display field 203 downward from the top in the menu display field 203 (see the arrow in the diagram). As illustrated in FIG. 8C, the display control unit 101 disposes the operation object 203*a* of the setting item of "poster" at an original position of the menu display field 203. Further, as illustrated in FIG. 6C, the display control unit 101 releases the highlighting on the operation object 203*a* of the moved setting item of "poster".

FIGS. 9A and 9B are diagrams illustrating a fourth display control example. FIG. 9A is a diagram illustrating a status in which a conflict setting item is moved based on a setting change release of a change setting item, and FIG. 9B is a diagram illustrating a state in which the movement of the conflict setting item is completed. In the example illustrated in FIGS. 9A and 9B, an example of display control of a setting item of "all in one sheet (N-up)" is illustrated. As described above, the setting item of "all in one sheet (N-up)" becomes a conflict setting item in a case where the function of the setting item of "poster" is used. Therefore, in a case where a setting for using the function of the setting item of "poster" is released, the setting item of "all in one sheet (N-up)" is not a conflict setting item and the setting can be changed.

In a case where the setting for using the function related to the setting item of "poster" is released, as illustrated in FIG. 9A, the display control unit 101 moves an operation object 203*b* of the setting item of "all in one sheet (N-up)" which is not a conflict setting item in the menu display field 203 upward from the bottom in the menu display field 203 (see the arrow in the diagram). As illustrated in FIG. 9B, the display control unit 101 disposes the operation object 203*b* of the setting item of "all in one sheet (N-up)" at an original position of the menu display field 203. Further, as illustrated in FIG. 9B, the display control unit 101 releases the highlighting on the operation object 203*b* of the moved setting item of "all in one sheet (N-up)".

In the example illustrated in FIGS. 6A to 6C and 7A and 7B and the examples shown in FIGS. 8A and 8C and 9A and 9B, the movement of the change setting item and the movement of the conflict setting item are described separately. However, since a conflict setting item is specified at the same time as a change setting item occurs, the display control unit 101 may simultaneously move an operation object of the change setting item and an operation object of the conflict setting item. Further, in the examples illustrated in FIGS. 6A to 6C and 7A and 7B, a conflict setting item generated in a case where forward priority is established is moved to a bottom in the menu display field 203. On the other hand, in a case where backward priority is established, a setting item of which a setting is firstly changed and which is moved to a top in the menu display field 203 becomes a conflict setting item, and moves to a bottom in the menu display field 203.

FIGS. 10A to 10C are diagrams illustrating a fifth display control example. FIG. 10A is a diagram illustrating a state in which a setting change for one setting item is performed, FIG. 10B is a diagram illustrating a status in which the changed setting item and a related setting item are moved, and FIG. 10C is a diagram illustrating a state in which the movement of the changed setting item and the related setting item is completed. In the example illustrated in FIGS. 10A to 10C, a display example in a case where a setting change of a setting item of "automatic image quality adjustment" is performed. The setting item of "automatic image quality adjustment" is a setting item related to a function of automatically adjusting setting values of a plurality of setting items (a copy density, sharpness, a chroma, a color tone, and the like) related to image quality. In the setting item of "automatic image quality adjustment", a combination of the setting values in each setting item related to image quality is determined in advance for each of image quality categories such as "standard image quality", "bright", and the like. In a case where a specific category is selected in the setting item of "automatic image quality adjustment", a setting value of each setting item related to image quality is set to a value defined for the selected category. That is, each setting item related to the image quality in which a setting value is changed by a setting change of the setting item of "automatic image quality adjustment" is a related setting item in a case where the setting item of "automatic image quality adjustment" becomes a change setting item.

In the example illustrated in FIG. 10 (A), a state in which "bright" is selected in the setting item of "automatic image quality adjustment" is illustrated. Here, in a case where "bright" is selected in the setting item of "automatic image quality adjustment", it is assumed that a setting value of a setting item of "copy density" is set to "−1" and a setting value of a setting item of "chroma" is set to "high". Therefore, the setting item of "copy density" and the setting item of "chroma" are related setting items for the setting item of "automatic image quality adjustment".

In a case where a setting change is performed on the setting item of "automatic image quality adjustment", as illustrated in FIG. 10B, the display control unit 101 moves an operation object 203*c* of the setting item of "automatic image quality adjustment" in the menu display field 203 upward of the menu display field 203 (see the arrow in the diagram). In the same manner, the display control unit 101 moves an operation object 203*d* of the setting item of "copy density" and an operation object (not illustrated in FIG. 10B) of the setting item of "chroma" which are related setting items upward of the menu display field 203. As illustrated in FIG. 10C, the display control unit 101 disposes the operation object 203*c* of the setting item of "automatic image quality adjustment" which is a change setting item at a top in the menu display field 203. In addition, the display control unit 101 moves the operation object 203*d* of the setting item of "copy density" and an operation object 203*e* of the setting item of "chroma" which are related setting items to a position next to the operation object 203*c* of the setting item of "automatic image quality adjustment". As illustrated in FIGS. 10B and 10C, the display control unit 101 highlights the operation object 203*c* of the setting item of "automatic image quality adjustment", the operation object 203*d* of the setting item of "copy density", and the operation object 203*e* of the setting item of "chroma" which are moved (in the illustrated example, displayed in a thick frame and displayed by being shifted to the left than other operation objects). In the example illustrated in FIGS. 10B and 10C, the operation object 203*c* of the setting item of "automatic image quality adjustment" which is a change setting item, and the operation object 203*d* of the setting item of "copy density" and the operation object 203*e* of the setting item of "chroma" which are related setting item are highlighted in the same display mode (in the illustrated example, displayed in a thick frame and displayed by being shifted to the left than other operation objects), but the operation object of the change setting item and the operation object of the related setting item may be highlighted in different display modes.

In the example illustrated in FIGS. 10A to 10C, both of the setting item of "copy density" and the setting item of "chroma" which are related setting items are moved to a top in the menu display field 203, and are easy to visually recognize that the setting items are changed. Further, the change setting item and the related setting item are closely and collectively disposed so as to easily find the related setting item. Here, the setting item of "copy density" and the setting item of "chroma" are related setting items, but are not conflict setting items. That is, after a setting change is performed on the setting item of "automatic image quality adjustment", both of the setting item of "copy density" and the setting item of "chroma" can be separately changed.

Specifically, it is considered a case where a setting change is performed on any of the setting items of "copy density" and the setting item of "chroma". For example, there is a case where a setting value of the setting item of "copy density" is set to a value other than "−1" or a setting value of the setting item of "chroma" is set to a value other than "high". In this case, the changed setting content does not correspond to the setting content corresponding to "bright" in the setting item of "automatic image quality adjustment". Therefore, backward priority is established by setting the changed setting item of "copy density" or setting item of "chroma" as a change setting item and setting the setting item of "automatic image quality adjustment" as a related setting item, the setting change of the setting item of "automatic image quality adjustment" illustrated in FIGS. 10A to 10C is released. For example, the setting change of the setting item of "automatic image quality adjustment" being released means that the setting content returns to an initial value such as "standard image quality" or the setting content becomes in a setting state to which classification by the setting item of "automatic image quality adjustment" is not applied.

Display Control of Setting Screen by Setting Change at Operation Start

Next, display control of the setting screen 200 in a case where a setting change is performed at a time of an operation start will be described. As described above, in a case where an operation of the image processing apparatus 100 is started, in a case of detecting that there is a conflict setting item for a change setting item, the image processing apparatus 100 needs to perform the operation after the conflict is resolved. The control unit 110 notifies the user that a conflict occurs, and prompts a setting operation for resolving the conflict.

Figure 11:
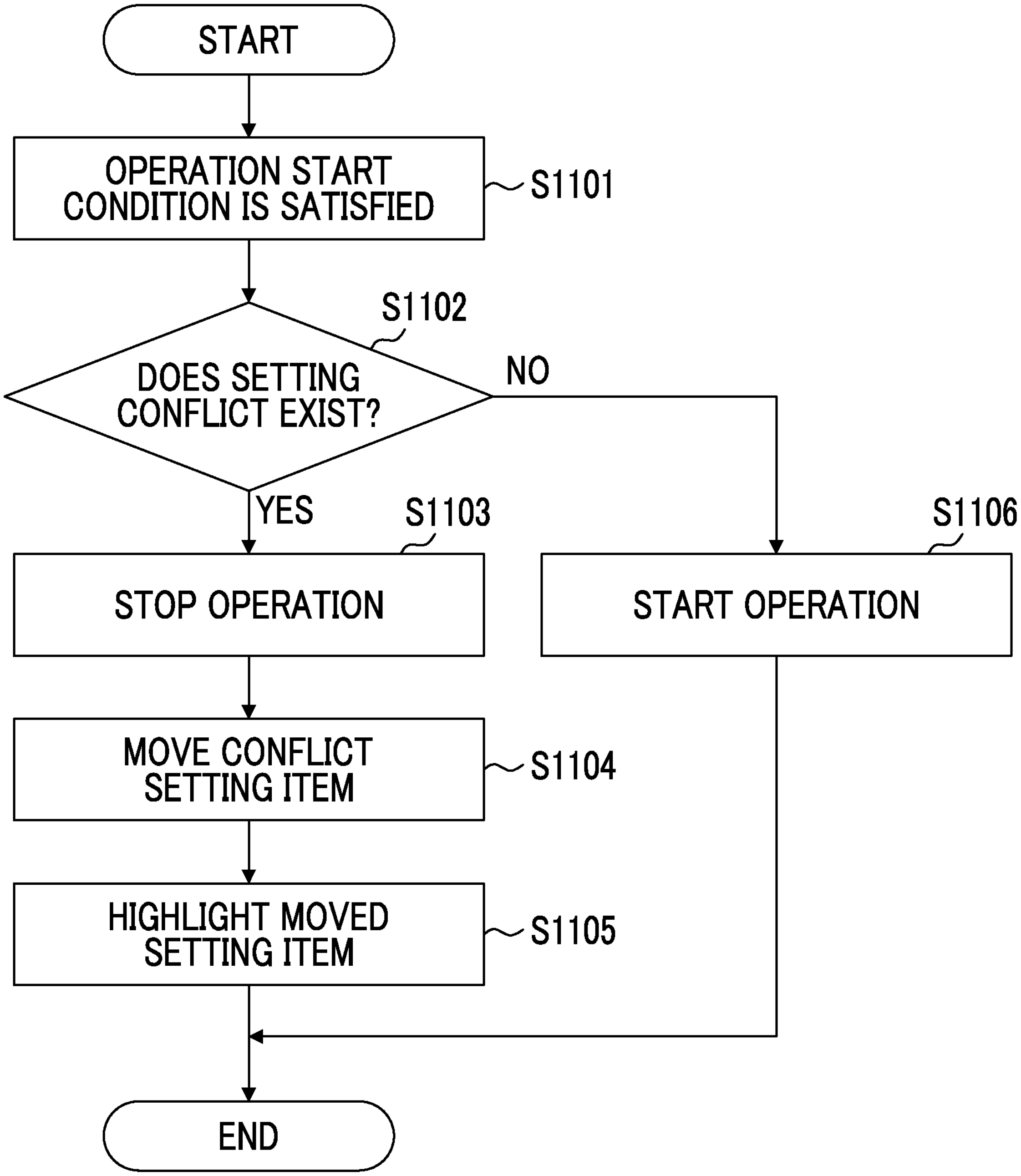
FIG. 11 is a flowchart illustrating display control of a setting screen by the display control unit in a case where a setting change is performed at a time of an operation start.

FIG. 11 is a flowchart illustrating display control of the setting screen 200 by the display control unit 101 in a case where a setting change is performed at a time of an operation start. It is assumed that a setting change by an operation of the user is performed on one or a plurality of setting items in advance. Therefore, a setting item (a change setting item) of which setting is changed is moved to a top in the menu display field 203 of the setting screen 200 and is highlighted. At this time, the image processing apparatus 100 (the control unit 110) does not recognize whether or not there is another setting item which conflicts with the setting item of which setting is changed. At a start of an operation by a set function, a relationship between setting items is recognized.

In a case where a start condition (for example, pressing a start button) of an operation by the set function is satisfied (S1101), the setting control unit 104 determines whether or not there is a setting conflict between a plurality of setting items. In a case where there is no setting conflict (NO in S1102), the control unit 110 starts the operation satisfying the start condition (S1106).

On the other hand, in a case where there is a setting conflict (YES in S1102), the control unit 110 stops the operation by the set function (S1103), and the display control unit 101 moves a conflict setting item to a position (directly below) following the change setting item in the menu display field 203 (S1104). The display control unit 101 highlights the moved conflict setting item and terminates the process (S1105).

In the example illustrated in FIGS. 5, 7A, and 7B, the conflict setting item is moved to a bottom in the menu display field 203. However, in a case where a setting conflict is detected at the start of the operation, in many cases, it is not possible to mechanically determine which of a setting content of the setting item of which setting is changed in advance or a setting content of the conflict setting item is adopted. Therefore, in the same manner as the case of the related setting item described with reference to FIGS. 10A to 10C, the user is notified by moving the conflict setting item to a next position of the setting item of which setting is changed in advance, and is prompted so as to perform a setting operation to resolve the conflict.

FIGS. 12A to 12C are diagrams illustrating a sixth display control example. FIG. 12A is a diagram illustrating an initial state in which a setting change is performed at a time of an operation start, FIG. 12B is a diagram illustrating a status in which a conflict setting item is moved, and FIG. 12C is a diagram illustrating a state in which the movement of the conflict setting item is completed. In the example illustrated in FIGS. 12A to 12C, a display example in a case where a setting content (single-sided→double-sided) of a setting item of "select single-sided/double-sided" of which setting operation is performed in advance and a setting content (a manual feeding tray) of a setting item of "select paper" conflict with each other is illustrated. The setting item of "select single-sided/double-sided" is a setting item for determining on which side of a sheet an image is to be formed in a case where the image forming unit 160 forms the image.

In the example illustrated in FIG. 12A, a setting is performed to form an image of a single-sided document on both sides of a sheet one by one. Since a setting change is performed on the setting item of "select single-sided/double-sided" in advance by an operation of the user, an operation object 203*f* is disposed at a top in the menu display field 203 and is highlighted. The setting item of "select paper" is a setting item for selecting a sheet of an output target. In the example illustrated in FIG. 12A, a setting for selecting a sheet set in a manual feeding tray is performed. Here, it is assumed that forming an image of a single-sided document on both sides of the sheet one by one cannot be performed on a sheet supplied from the manual feed tray. That is, a setting content of the setting item of "select single-sided/double-sided" and a setting content of the setting item of "select paper" conflict with each other.

In a case where a start condition of an output operation is satisfied (for example, in a case where an operation button of "start" displayed on the header 201 is touched), the setting control unit 104 detects that the setting content of the setting item of "select single-sided/double-sided" and the setting content of the setting item of "select paper" conflict with each other. As illustrated in FIG. 12B, the display control unit 101 moves an operation object 203*g* of the setting item of "select paper" in the menu display field 203 upward of the menu display field 203 (see the arrow in the diagram). As illustrated in FIG. 12C, the display control unit 101 disposes the operation object 203*g* of the setting item of "select paper" at a position next to the operation object 203*f* of the setting item of "select single-sided/double-sided" and highlights the operation object 203*g*. In the example illustrated in FIGS. 12B and 12C, the operation object 203*g* of the setting item of "select paper" and the operation object 203*f* of the setting item of "select single-sided/double-sided" are highlighted in the same mode (displayed in a thick frame and displayed by being shifted to the left than other operation objects), but a setting item of which setting is changed in advance and a setting item detected to conflict with the setting item at a time of an operation start are distinguished and highlighted in different display modes.

Modification Example

In the example of the display control illustrated in FIGS. 6A to 10C and FIGS. 12A to 12C, in a moving image expression in a case where moving a setting item (an operation object), after the setting item (the operation object) moves upward or downward of the menu display field 203, a setting item (an operation objects) remain at an original position. Various display modes can be considered for display the moved setting item (the operation object). For example, after the movement of the setting item (the operation object) is completed, the setting item (the operation object) at the original position may be deleted. In this case, an empty space after the setting item (the operation object) at the original position may be filled by moving a setting item (an operation object) positioned below the setting item upward. In addition, also after the movement of the setting item (the operation object) is completed, the setting item (the operation object) at the original position may be maintained to be displayed. Further, in a different manner from the illustrated example, in a case where the movement of the setting item (the operation object) is started, the setting item (the operation object) at the original position may be moved without being left. That is, a moving image expression is performed so that the setting item (the operation object) deviates from the original position and moves upward or downward.

In addition, in the operation example described above, only moving the setting item (the operation object) is described, but a movement different from the simple movement may be expressed. For example, in a case of moving the setting item, a moving speed may be changed (for example, accelerated or decelerated), or an operation different from a movement in a moving direction at a start of the movement may be performed (vibration, movement to come up to the front, or the like). Further, in the illustrated example, the highlighting is performed in a case of moving the setting item (the operation object), but highlighting may be performed after movement is completed, or highlighting may be performed dynamically during the movement.

Although the present exemplary embodiments are described, a technical scope of the present exemplary embodiment of the invention is not limited to the exemplary embodiments. For example, in the exemplary embodiment described above, an operation object of a setting item of which setting is changed is moved to a predetermined position and is highlighted, but the operation object may be only moved by using a moving image expression without the highlighting. In addition, in the exemplary embodiment described above, respectively, a change setting item is moved to a top of the menu display field 203, a related setting item is moved to a next position of the change setting item, and a conflict setting item is moved to a bottom of the menu display field 203, but a specific setting item may be moved to a specially defined position different from these, for example.

Further, in the exemplary embodiment described above, the scroll bar 206 scrolls the setting screen 200, but in a touch panel in which the operation unit 130 and the display unit 140 are combined, the menu display field 203 may be scrolled by a finger dragging a screen. In addition, in the exemplary embodiment described above, the menu display field 203 has a configuration in which the setting items are arranged in parallel, but the setting items may be classified and hierarchically arranged. In this case, the setting item may be moved in the identical classification or the identical hierarchy, or may be moved to the highest hierarchy beyond the classification or hierarchy.

Further, in the present exemplary embodiment, the example applied to the image processing apparatus as an information processing apparatus is described, but the present exemplary embodiment can be applied to various information processing apparatuses including an interface apparatus which displays a setting screen in which settable setting items are arranged. In addition, various modifications and alternative configurations without departing from the scope of the technical idea of the exemplary embodiments of the present invention are included in the exemplary embodiments of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An interface apparatus comprising:

one or more processors programmed to:

receive, from a user, designation of a setting change to at least one setting item;

move, on a setting screen displayed on a display, the at least one setting item of which setting has been designated to change;

display, on the display, a movement of the at least one setting item of which setting has been designated to change from an original position to a position of a movement destinations;

after the movement of the at least one setting item, the at least one setting item is displayed in a display manner different than a display manner in which other setting items are displayed;

after the movement of the one or more other setting items, the one or more other setting items are displayed in a display manner different than a display manner in which other setting items are displayed;

if the changed setting of the at least one setting item and a setting of the one or more other setting items are detected to be in conflict at a start of an operation by the particular function, prevents the operation from being executed and move the at least one setting item and the one or more other setting items;

move the at least one setting item to a beginning of the list of setting items on the setting screen; and move the one or more other setting items with a setting that conflicts with the changed setting of the at least one setting item, to a position following the at least one setting item, wherein if the designated setting change to the at least one item requires a setting change of one or more other setting items, move the one or more other setting items on the screen, wherein the at least one setting item is related to a particular function, wherein a list of setting items is displayed on the setting screen.

2. The interface apparatus according to claim 1, wherein the at least one setting item is moved to a beginning of the list of setting items on the setting screen, and the one or more other setting items are moved to a position following the at least one setting item.

3. The interface apparatus according to claim 2, wherein the one or more processors are further programmed to:

move a setting item of which setting is not permitted to be changed while the changed setting of the at least one setting item is set, to an end of the list of setting items on the setting screen.

4. The interface apparatus according to claim 1, wherein the at least one setting item and the one or more other setting items are displayed in different display manners.

5. The interface apparatus according to claim 1, wherein the at least one setting item and the one or more other setting items with a setting that conflicts with the changed setting of the at least one setting item are displayed in different manners.

6. The interface apparatus according to claim 1, wherein a list of setting items is displayed on the setting screen, and the at least one setting item is moved to a head of the list of setting items on the setting screen.

7. The interface apparatus according to claim 1, wherein, the movement of the at least one setting item is a scrolling movement.

8. An information processing apparatus comprising:

one or more processors programmed to:

receive, from a user, designation of a setting change to at least one setting item;

move, on a setting screen displayed on a display, the at least one setting item of which setting has been designated to change; and display, on the display, a movement of the at least one setting item of which setting has been designated to change from an original position to a position of a movement destination;

after the movement of the at least one setting item, the at least one setting item is displayed in a display manner different than a display manner in which other setting items are displayed;

after the movement of the one or more other setting items, the one or more other setting items are displayed in a display manner different than a display manner in which other setting items are displayed;

if the changed setting of the at least one setting item and a setting of the one or more other setting items are detected to be in conflict at a start of an operation by the particular function, prevents the operation from being executed and move the at least one setting item and the one or more other setting items;

move the at least one setting item to a beginning of the list of setting items on the setting screen; and move the one or more other setting items with a setting that conflicts with the changed setting of the at least one setting item, to a position following the at least one setting item, wherein if the designated setting change to the at least one item requires a setting change of one or more other setting items, move the one or more other setting items on the screen, wherein the at least one setting item is related to a particular function, wherein a list of setting items is displayed on the setting screen.

9. A non-transitory computer readable medium storing a program causing one or more processor in a computer to realize to:

receive, from a user, designation of a setting change to at least one setting item;

move, on a setting screen displayed on a display, the at least one setting item of which setting has been designated to change; and display, on the display, a movement of the at least one setting item of which setting has been designated to change from an original position to a position of a movement destination;

after the movement of the at least one setting item, the at least one setting item is displayed in a display manner different than a display manner in which other setting items are displayed;

after the movement of the one or more other setting items, the one or more other setting items are displayed in a display manner different than a display manner in which other setting items are displayed;

if the changed setting of the at least one setting item and a setting of the one or more other setting items are detected to be in conflict at a start of an operation by the particular function, prevents the operation from being executed and move the at least one setting item and the one or more other setting items;

move the at least one setting item to a beginning of the list of setting items on the setting screen; and move the one or more other setting items with a setting that conflicts with the changed setting of the at least one setting item, to a position following the at least one setting item, wherein if the designated setting change to the at least one item requires a setting change of one or more other setting items, move the one or more other setting items on the screen, wherein the at least one setting item is related to a particular function, wherein a list of setting items is displayed on the setting screen.

10. An interface apparatus comprising:

one or more processors programmed to:

receive, from a user, designation of a setting change to at least one setting item; and if the designated setting change to the at least one item requires a setting change of one or more other setting items, move the one or more other setting item on a setting screen displayed on a display, display, on the display, a movement of the one or more other setting item from an original position to a position of a movement destination, if the changed setting of the at least one setting item and a setting of the one or more other setting items are detected to be in conflict at a start of an operation by the particular function, prevent the operation from being executed and move the one or more other setting items, move the one or more other setting items with a setting that conflicts with the changed setting of the at least one setting item, to a position following the at least one setting item wherein after the movement of the one or more setting items, the one or more setting items are displayed in a display manner different than a display manner in which other setting items are displayed, wherein the at least one setting item is related to a particular function, wherein a list of setting items is displayed on the setting screen.

11. The interface apparatus according to claim 10, wherein the one or more other setting items are moved to a position following the at least one setting item.

12. The interface apparatus according to claim 10, wherein the one or more processors are further programmed to:

move a setting item of which setting is not permitted to be changed while the changed setting of the at least one setting item is set, to an end of the list of setting items on the setting screen.

13. The interface apparatus according to claim 10, the at least one setting item and the one or more other setting items are displayed in different display manners.

14. The interface apparatus according to claim 10, wherein the at least one setting item and the one or more other setting items with a setting that conflicts with the changed setting of the at least one setting item are displayed in different manners.

* * * * *